(12) United States Patent
Jang et al.

(10) Patent No.: US 9,318,762 B2
(45) Date of Patent: Apr. 19, 2016

(54) CONDUCTING POLYMER-TRANSITION METAL ELECTRO-CATALYST COMPOSITIONS FOR FUEL CELLS

(75) Inventors: Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1774 days.

(21) Appl. No.: 11/704,873

(22) Filed: Feb. 12, 2007

(65) Prior Publication Data

US 2008/0193827 A1    Aug. 14, 2008

(51) Int. Cl.
| | |
|---|---|
| *H01M 4/90* | (2006.01) |
| *H01M 8/10* | (2006.01) |
| *H01B 1/12* | (2006.01) |
| *H01M 4/86* | (2006.01) |
| *H01M 4/92* | (2006.01) |

(52) U.S. Cl.
CPC ............. *H01M 8/1004* (2013.01); *H01B 1/122* (2013.01); *H01M 4/8605* (2013.01); *H01M 4/8652* (2013.01); *H01M 4/9008* (2013.01); *H01M 4/921* (2013.01); *H01M 2008/1095* (2013.01); *Y02E 60/521* (2013.01)

(58) Field of Classification Search
CPC ................... H01M 2008/1095; H01M 4/8605; H01M 4/8652; H01M 4/9008; H01M 4/921; H01M 8/1004; Y02E 60/521
USPC ............................ 429/523, 524; 205/313, 325
See application file for complete search history.

(56) References Cited

U.S. PATENT DOCUMENTS

| | | | |
|---|---|---|---|
| 4,876,115 A | 10/1989 | Raistrick | |
| 4,880,508 A | 11/1989 | Aldissi | |
| 5,109,070 A | 4/1992 | Epstein et al. | |
| 5,137,991 A | 8/1992 | Epstein et al. | |

(Continued)

OTHER PUBLICATIONS

Z. Qi, et al., "Electron and Proton Transport in GDL Containing Electronically Conductive Proton-Exchange Polymers," Journal of Electroanalytical Chemistry, 459 (1998) 9-14.

(Continued)

*Primary Examiner* — Basia Ridley
*Assistant Examiner* — Heng Chan

(57) ABSTRACT

An electro-catalyst composition for use as an electrode, gas diffusion layer-supported electrode, catalytic electrode-coated solid electrolyte layer, and/or membrane-electrode assembly in a proton exchange membrane (PEM) type fuel cell. The composition comprises: (a) a proton- and electron-conducting polymer having at least one heteroatom per backbone monomer unit thereof and a plurality of neutral transition metal atoms covalently bonded to at least a portion of the heteroatoms; wherein the polymer has an electronic conductivity no less than $10^{-4}$ S/cm and a proton conductivity no less than $10^{-5}$ S/cm. Preferably, the electro-catalyst composition further comprises (b) a plurality of catalytically active particles of a transition metal, nucleated around the covalently bonded transition metal atoms. Also preferably, additional catalytically active catalyst particles with an average dimension smaller than 2 nm (most preferably smaller than 1 nm) are physically dispersed in such a polymer and typically not chemically bonded thereto. A hydrogen-oxygen PEM fuel cell or a direct methanol fuel cell (DMFC) featuring such an electro-catalyst composition in a thin-film electrode exhibits a superior current-voltage response.

16 Claims, 8 Drawing Sheets

(56) References Cited

U.S. PATENT DOCUMENTS

| | | | |
|---|---|---|---|
| 5,211,984 | A | 5/1993 | Wilson |
| 5,334,292 | A | 8/1994 | Rajeshwar et al. |
| 5,589,108 | A | 12/1996 | Shimizu et al. |
| 5,648,453 | A | 7/1997 | Saida et al. |
| 5,677,074 | A | 10/1997 | Serpico et al. |
| 5,846,670 | A | 12/1998 | Watanabe et al. |
| 6,015,635 | A | 1/2000 | Kawahara |
| 6,074,773 | A | 6/2000 | Wilkinson et al. |
| 6,187,467 | B1 | 2/2001 | Zhang et al. |
| 6,344,291 | B1 | 2/2002 | Hitomi |
| 6,380,126 | B1 | 4/2002 | Finkelsshtain et al. |
| 6,479,181 | B2 | 11/2002 | Finkelsshtain et al. |
| 6,492,295 | B2 | 12/2002 | Hitomi |
| 6,730,350 | B2 | 5/2004 | Finkelsshtain et al. |
| 6,878,664 | B1 | 4/2005 | Finkelsshtain et al. |
| 2004/0042955 | A1 | 3/2004 | Srinivas |
| 2004/0109816 | A1 | 6/2004 | Srinivas et al. |
| 2004/0110051 | A1 | 6/2004 | Srinivas |
| 2004/0110052 | A1 | 6/2004 | Srinivas |
| 2004/0144961 | A1 | 7/2004 | Srinivas |
| 2004/0166401 | A1 | 8/2004 | Srinivas |
| 2004/0169165 | A1* | 9/2004 | Srinivas .................. 252/511 |
| 2004/0224218 | A1* | 11/2004 | Fan ............................. 429/44 |

OTHER PUBLICATIONS

K. Bouzek, et al., "Utilization of Nafion/Conducting Polymer Composite in the PEM Type Fuel Cells," Journal of Applied Electrochemistry, 37 (2007) 137-145.

H. Lee, et al., "Performance of Polypyrrole-impregnated Composite Electrode for Unitized Regenerative Fuel Cell," Journal of Power Source, 131 (2004) 188-193.

* cited by examiner

Aggregate of carbon black particles $\sigma_1, \rho_1, R_1, t_1$ = conductivity, resistivity, resistance and thickness of the top layer (carbon fiber material)

$\sigma_3, \rho_3, R_3, t_3$ = conductivity, resistivity, resistance and thickness of the bottom layer (carbon black)

$\sigma_2, \rho_2, R_2, t_2$ = conductivity, resistivity, resistance and thickness of core layer (electrolyte)

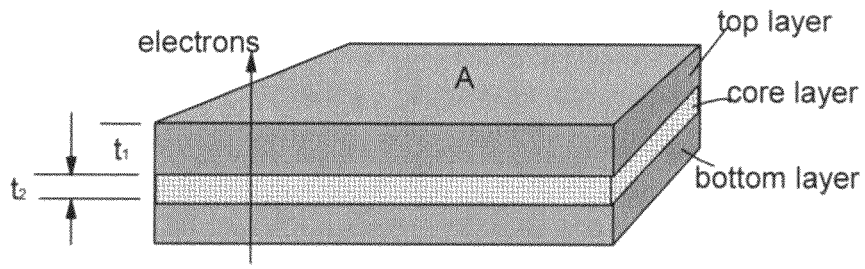

$R_1 = \rho_1 t_1/A_1 \quad R_2 = \rho_2 t_2/A_2 \quad R_3 = \rho_3 t_3/A_3 \quad A_1 = A_2 = A_3 = A_s$ $R_s = R_1 + R_2 + R_3 = (\rho_1 t_1 + \rho_2 t_2 + \rho_3 t_3)/A_s = \rho_s(t_1 + t_2 + t_3)/A_s$ $\rho_s = (\rho_1 t_1 + \rho_2 t_2 + \rho_3 t_3)/(t_1 + t_2 + t_3) \quad \sigma_s = 1/\rho_s$

FIG.3

CONDUCTING POLYMER-TRANSITION METAL ELECTRO-CATALYST COMPOSITIONS FOR FUEL CELLS

FIELD OF THE INVENTION

This invention relates to an electro-catalyst composition that can be used in a fuel cell electrode, a catalyst-coated membrane (CCM), and a membrane-electrode assembly (MEA). The composition forms a thin electrode layer that is both proton- and electron-conductive, which is particularly useful for proton exchange membrane-type fuel cells (PEM-FC), including hydrogen-fed and direct alcohol fuel cells.

BACKGROUND OF THE INVENTION

The proton exchange membrane or polymer electrolyte membrane fuel cell (PEM-FC) has been a topic of highly active R&D efforts during the past two decades. The operation of a fuel cell normally requires the presence of an electrolyte and two electrodes, each comprising a certain amount of catalysts, hereinafter referred to as electro-catalysts. A hydrogen-oxygen PEM-FC uses hydrogen or hydrogen-rich reformed gases as the fuel while a direct-methanol fuel cell (DMFC) uses methanol solution as the fuel. The PEM-FC and DMFC, or other direct organic fuel cells, are collectively referred to as the PEM-type fuel cell.

A PEM-type fuel cell is typically composed of a seven-layered structure, including a central polymer electrolyte membrane for proton transport, two thin electro-catalyst layers on the two opposite sides of the electrolyte membrane in which chemical reactions occur, two gas diffusion layers (GDLs) or electrode-backing layers stacked on the corresponding electro-catalyst layers, and two flow field plates stacked on the GDLs. Each GDL normally comprises a sheet of porous carbon paper or cloth through which reactants and reaction products diffuse in and out of the cell. The flow field plates, also commonly referred to as bipolar plates, are typically made of carbon, metal, or composite graphite fiber plates. The bipolar plates also serve as current collectors. Gas-guiding channels are defined on a surface of a GDL facing a flow field plate, or on a flow field plate surface facing a GDL. Reactants and reaction products (e.g., water) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling and humidifying means may be added to assist in the operation of a fuel cell stack.

Several of the above-described seven layers may be integrated into a compact assembly, e.g., the membrane-electrode assembly (MEA). The MEA typically includes a selectively permeable polymer electrolyte membrane bonded between two electrodes (an anode and a cathode). A commonly used PEM is poly (perfluoro sulfonic acid) (e.g., Nafion® from du Pont Co.), its derivative, copolymer, or mixture. Each electrode typically comprises a catalyst backing layer (e.g., carbon paper or cloth) and an electro-catalyst layer disposed between a PEM layer and the catalyst backing layer. Hence, in actuality, an MEA may be composed of five layers: two catalyst backing, two electro-catalyst layers, and one PEM layer interposed between the two electro-catalyst layers. Most typically, the two electro-catalyst layers are coated onto the two opposing surfaces of a PEM layer to form a catalyst-coated membrane (CCM). The CCM is then pressed between a carbon paper layer (the anode backing layer) and another carbon paper layer (the cathode backing layer) to form an MEA. It may be noted that, some workers in the field of fuel cells refer a CCM as an MEA. Commonly used electro-catalysts include noble metals (e.g., Pt), rare-earth metals (e.g., Ru), and their alloys. Known processes for fabricating high performance MEAs involve painting, spraying, screen-printing and hot-bonding catalyst layers onto the electrolyte membrane and/or the catalyst backing layers.

An electro-catalyst is needed to induce the desired electro-chemical reactions at the electrodes or, more precisely, at the electrode-electrolyte interfaces. The electro-catalyst may be a metal black, an alloy, or a supported metal catalyst, for example, platinum supported on carbon. In real practice, an electro-catalyst can be incorporated at the electrode-electrolyte interfaces in a PEM fuel cell by depositing a thin film of the electro-catalyst on either an electrode substrate (e.g., a surface of a carbon paper-based backing layer) or a surface of the membrane electrolyte (the PEM layer). In the former case, electro-catalyst particles are typically mixed with a liquid to form a slurry (ink or paste), which is then applied to the electrode substrate. While the slurry preferably wets the substrate surface to some extent, it must not penetrate too deeply into the substrate, otherwise some of the catalyst will not be located at the desired membrane-electrode interface. In the latter case, electro-catalyst particles are coated onto the two primary surfaces of a membrane to form a catalyst-coated membrane (CCM). The slurry, ink, or paste is hereinafter referred to as a precursor electro-catalyst composition.

Electro-catalyst sites must be accessible to the reactants (e.g., hydrogen on the anode side and oxygen on the cathode side), electrically connected to the current collectors, and ionically connected to the electrolyte membrane layer. Specifically, electrons and protons are typically generated at the anode electro-catalyst. The electrons generated must find a path (e.g., the backing layer and a current collector) through which they are transported to an external electric circuit. The protons generated at the anode electro-catalyst must be quickly transferred to the PEM layer through which they migrate to the cathode. Electro-catalyst sites are not productively utilized if the protons do not have a means for being quickly transported to the ion-conducting electrolyte. For this reason, coating the exterior surfaces of the electro-catalyst particles and/or electrode backing layer (carbon paper or fabric) with a thin layer of an ion-conductive ionomer has been used to increase the utilization of electro-catalyst exterior surface area and increase fuel cell performance by providing improved ion-conducting paths between the electro-catalyst surface sites and the PEM layer (e.g., FIGS. 1(a) and 1(b)). Such an ion-conductive ionomer is typically the same material used as the PEM in the fuel cell. An ionomer is an ion-conducting polymer. For the case of a PEM fuel cell, the conducting ion is typically the proton and the ionomer is a proton-conducting polymer. The ionomer can be incorporated in the catalyst ink (precursor electro-catalyst composition) or can be applied on the catalyst-coated substrate afterwards. This approach has been followed by several groups of researchers, as summarized in the following patents [1-9]:

1) D. P. Wilkinson, et al., "Impregnation of micro-porous electro-catalyst particles for improving performance in an electrochemical fuel cell," U.S. Pat. No. 6,074,773 (Jun. 13, 2000).
2) J. Zhang, et al., "Ionomer impregnation of electrode substrate for improved fuel cell performance," U.S. Pat. No. 6,187,467 (Feb. 13, 2001).
3) I. D. Raistrick, "Electrode assembly for use in a solid polymer electrolyte fuel cell," U.S. Pat. No. 4,876,115 (Oct. 24, 1989).

4) M. S. Wilson, "Membrane catalyst layer for fuel cells," U.S. Pat. No. 5,211,984 (May 18, 1993).
5) J. M. Serpico, et al., "Gas diffusion electrode," U.S. Pat. No. 5,677,074 (Oct. 14, 1997).
6) M. Watanabe, et al., "Gas diffusion electrode for electrochemical cell and process of preparing same," U.S. Pat. No. 5,846,670 (Dec. 8, 1998).
7) T. Kawahara, "Electrode for fuel cell and method of manufacturing electrode for fuel cell," U.S. Pat. No. 6,015,635 (Jan. 18, 2000).
8) S. Hitomi, "Solid polymer electrolyte-catalyst composite electrode, electrode for fuel cell, and process for producing these electrodes," U.S. Pat. No. 6,344,291 (Feb. 5, 2002).
9) S. Hitomi, et al. "Composite catalyst for solid polymer electrolyte-type fuel cell and process for producing the same," U.S. Pat. No. 6,492,295 (Dec. 10, 2002).
10) B. Srinivas and A. O. Dotson, "Proton Conductive Carbon Material for Fuel Cell," US 2004/0109816 (Pub. Jun. 10, 2004).
11) B. Srinivas, "Sulfonated Carbonaceous Materials," US 2004/0042955 (Pub. Mar. 4, 2004).
12) B. Srinivas, "Sulfonated Conducting Polymer-Grafted Carbon Material for Fuel Cell Applications," US 2004/0110051 (Pub. Jun. 10, 2004).
13) B. Srinivas, "Conducting Polymer-Grafted Carbon Material for Fuel Cell Applications," US 2004/0110052 (Pub. Jun. 10, 2004).
14) B. Srinivas, "Metallized Conducting Polymer-Grafted Carbon Material and Method for Making," US 2004/0144961 (Pub. Jul. 29, 2004).
15) B. Srinivas, "Conducting Polymer-Grafted Carbon Material for Fuel Cell Applications," US 2004/0166401 (Pub. Aug. 26, 2004).
16) B. Srinivas, "Sulfonated Conducting Polymer-Grafted Carbon Material for Fuel Cell Applications," US 2004/0169165 (Pub. Sep. 2, 2004).

However, this prior-art approach [1-9] of ionomer impregnation into the electrode layer and/or onto electro-catalyst particle surfaces has a serious drawback in that the ionomer commonly used as the PEM material, although ion-conducting (proton-conducting), is not electronically conducting (FIG. 1(a). This is due to the consideration that a proton-exchange membrane, when serving as the solid electrolyte layer, cannot be an electronic conductor; otherwise, there would be internal short-circuiting, resulting in fuel cell failure and possible fire hazard. Such an electronically non-conductive material, when coated onto the surface of a catalyst particle or carbon paper fiber, will render the catalyst particle or carbon fiber surface electronically non-conductive. This would prevent the electrons generated at the catalyst sites from being quickly collected by the anode electrode substrate layer and the current collector, thereby significantly increasing the Ohmic resistance and reducing the fuel cell performance. We recognized that this impregnation or coating material should not be the same ionomer used as the PEM material. Our work led to the following patent applications:

17. Bor Z. Jang, Aruna Zhamu, and Jiusheng Guo, "Process for Producing Fuel Cell Electrode, Catalyst-Coated Electrode, and Membrane-Electrode Assembly," U.S. patent application Ser. No. 11/522,580 (Sep. 19, 2006.
18. Bor Z. Jang, Aruna Zhamu, and Jiusheng Guo, "Electro-catalyst Composition, Fuel Cell Electrode, and Membrane-Electrode Assembly," U.S. patent application Ser. No. 11/518,565 (Sep. 11, 2006).
19. Bor Z. Jang, Aruna Zhamu, and Jiusheng Guo, "Electro-catalyst Compositions for Fuel Cells," U.S. patent application Ser. No. 11/582,912 (Oct. 19, 2006).
20. Bor Z. Jang, Aruna Zhamu, and Jiusheng Guo, "Fuel Cell Electro-catalyst Composite Composition, Electrode, Catalyst-Coated Membrane, and Membrane-Electrode Assembly," U.S. patent application Ser. No. 11/699,176 (Jan. 30, 2007).

In these co-pending applications [Ref. 17-20], we disclosed several new classes of electro-catalyst compositions and the processes for producing these compositions and their derived electrodes, catalyst-coated membranes (CCMs), and membrane electrode assemblies (MEAs) for PEM fuel cell applications. The electro-catalyst composition and a precursor electro-catalyst composition (e.g., ink or suspension), when used in the formation of a fuel cell catalytic electrode layer, results in a significantly improved power output. The precursor electro-catalyst composition, when deposited onto a substrate with the liquid removed, forms an electro-catalyst composition that essentially constitutes an electrode layer (a catalytic anode or cathode film). The substrate in this context can be a gas diffusion layer (carbon paper or cloth) or a PEM layer. Ultimately, the electro-catalyst is sandwiched between a gas diffusion layer and a PEM layer.

The electro-catalyst composition in the second co-pending application [Ref. 18] comprises (e.g., FIG. 4(a)): (a) a catalyst un-supported or supported on an electronically conducting carrier (e.g., carbon black particles, CB); and (b) an ion-conducting and electron-conducting coating/impregnation material in physical contact with the catalyst (e.g., this impregnation material is coated on a surface of the carrier or the catalyst particles are embedded in this impregnation material), wherein the coating/impregnation material has an electronic conductivity no less than $10^{-4}$ S/cm (preferably no less than $10^{-2}$ S/cm) and an ion conductivity no less than $10^{-5}$ S/cm (preferably no less than $10^{-3}$ S/cm). Typically, this coating/impregnation material is not chemically bonded to either the carbon black surface or the catalyst and this coating or impregnation material forms a contiguous matrix with the catalyst particles dispersed therein. This contiguous matrix, along with the conductive CB particles, forms bi-networks of charge transport paths (one for electrons and the other for protons) in a fuel cell electrode, leading to much improved fuel cell performance with much reduced resistive loss, higher catalyst utilization efficiency, and higher cell output voltage. The second co-pending application [Ref. 18] also discloses a precursor composition (e.g., an ink) that leads to the formation of the desired electro-catalyst composition or catalytic electrode by simply removing the liquid ingredient from the ink (no chemical treatment required and no chemical bonding or reaction involved).

The third co-pending application [Ref. 19] discloses another class of precursor electro-catalyst compositions that lead to the desired electro-catalyst composition by removing the liquid medium from the composition and inducing a chemical conversion or reaction of other ingredient(s) in the precursor composition. This precursor electro-catalyst composition comprises a precursor molecular metal, which can be chemically converted to nano-scaled catalyst particles via heating or energy beam exposure (e.g., UV light, ion beam, Gamma radiation, or laser beam) during or after the precursor composition is deposited with its liquid ingredient being removed. The process for producing an electrode, its CCM and MEA from this precursor electro-catalyst composition is disclosed in the first co-pending application [Ref. 17].

It may be noted that Srinivas [Ref. 10-16] prepared a group of sulfonated carbon black (CB) or conducting polymer-grafted CB particles (FIG. 2) for fuel cell applications. The sulfonated carbon material was typically obtained by reacting an anhydride with a sulfuric acid to first obtain an organic sulfate intermediate, which was then reacted with CB to impart $SO_3H$ groups to the CB. Alternatively, a multiple-step diazoitization was used to impart $\Phi$-$SO_3H$ groups ($\Phi$=a benzene ring). These groups were then coated with or bonded to a conducting polymer to improve the electronic conductivity of surface-treated CB particles. Further alternatively, a complex oxidative polymerization step was taken to graft a conducting polymer to CB surface, followed by sulfonation, or to obtain a grafted sulfonated conducting polymer from a sulfonated monomer [12-16]. The technology proposed by Srinivas is vastly different and patently distinct from our technology as represented by the four co-pending applications in the following ways:

(1) Srinivas's compositions are basically carbon black (CB) particles with their surfaces chemically bonded with either $SO_3H$ type functional groups or a mono-layer of conductive polymer chains. In essence, these are just surface-modified CB particles that contain a minute amount of surface functional groups and chains. In the resulting electrode, individual CB particles were being packed together but remaining as discrete particles (FIG. 1 of Ref. 12-14) in such a manner that the surface-bound chains were of insufficient amount to form a continuous matrix material of structural integrity. The requirement for these particles to strictly maintain a contiguous network is a major drawback of this prior art technology. First, it is not natural for discrete particles to form and maintain contiguity, unless the volume fraction of these particles is excessively high with respect to the surface-bound groups or chains. In such a high-loading situation (with only a small amount of surface bound groups or chains), the resulting cluster or aggregate structure is very weak in terms of mechanical strength and, hence, tends to form cracks and fail to perform its intended functions.

In contrast, the coating, impregnation or matrix material in our co-pending applications is NOT chemically bonded to either the CB surface or the catalyst. More importantly, this coating, impregnation, or matrix material serves to form a contiguous matrix with the catalyst particles dispersed therein in such a fashion that the catalyst particles or their supporting CB particles do not have to form a contiguous structure in order to maintain two charge transport paths (one for electrons and the other for proton). This matrix material is both electron- and proton-conducting anyway. When the unsupported catalysts or supported catalysts, along with the matrix material, are cast into a thin electrode layer, the matrix material automatically provides the two charge transport networks (whether the catalyst particles or CB particles form a continuous network or not).

(2) Srinivas's compositions did not include those with unsupported catalyst particles. They have essentially worked on catalysts supported on surface-grafted or -bonded CB particles only.

(3) Srinivas's compositions involved complicated and time-consuming surface chemical bonding, grafting, and/or polymerization procedures. In contrast, the compositions in our co-pending applications involve physically dispersing catalysts or carbon-supported catalysts in a fluid (a benign solvent such as a mixture of water and isopropanol in which a proton- and electron-conducting polymer is dissolved). No chemical reaction is needed or involved.

(4) In the case of surface functionalization [10,11], an electronically non-conducting moiety is interposed between the CB and the conducting polymer, which could significantly reduce the local electron conductivity.

(5) It is known that only a small number of functional groups can be chemically bonded to a carbon black surface and, hence, a very limited number of polymer chains are grafted to the surface. Such a surface-treated CB still has limited conductivity improvements. In fact, Srinivas could not even measure the electron and proton conductivity of these monolayers of surface groups or grafted polymer chains. He had to mix the surface bonded CB particles with Nafion® prior to a conductivity measurement. The conductivity values obtained are not representative of the conductivities of surface-treated CB particles.

(6) Although Srinivas's CB particles might be individually proton- and electron-conductive on the surface, they must cluster together to form a contiguous structure to maintain an electron-conducting path and a proton-conducting path. This is not always possible when they are used to form an electrode bonded to a PEM surface or a carbon paper surface. Due to only an extremely thin layer of chemical groups or chains being bonded to an individual CB particle, the resulting electrode can be very fragile and interconnected pores (desirable for gas diffusion) tend to interrupt their contiguity. Operationally, it is very difficult to form an integral layer of catalytic electrode from these modified CB particles alone. These shortcomings are likely the reasons why the data provided by Srinivas showed very little improvement in performance of the fuel cell featuring these coated CB particles. For instance, FIG. 8 of Ref. 10 and FIG. 8 of Ref. 12 show that the best improvement achieved by surface-bonded CB particles was a voltage increase from 0.54 V to 0.59V at 700 $mA/cm^2$, less than 10% improvement. However, a decrease in voltage was observed at higher current densities. In contrast, our electro-catalyst compositions naturally form two charge transport paths, which are unlikely to be interrupted during the electrode formation process. We have consistently achieved outstanding fuel cell performance improvements (greater than 20% in many cases).

One special feature of the fourth co-pending invention [Ref. 20] is an electro-catalyst composite composition (e.g., FIG. 4(b)) that comprises nano-scaled catalyst particles supported on highly electron-conducting nano-scaled carbon/graphite materials such as carbon nanotubes (CNTs), nanometer-thickness graphite platelets or nano-scaled graphene plates (NGPs), carbon nano-scrolls (CNS, formed by scrolling up NGPs), carbon nano-fibers (CNFs), and graphitic nano-fibers (GNFs, which are ultra-high temperature treated CNFs). These materials exhibit an electrical conductivity that is several orders of magnitude higher than that of carbon blacks (CB). Their electrical conductivity values are also typically much higher than those of the electron- and proton-conducting matrix polymers. These elongated particles (CNTs, NGPs, CNS, CNFs, and GNFs) have an ultra-high aspect ratio (largest dimension/smallest dimension) that enable the formation of a contiguous network of electron-conductive paths with a minimum amount of particles (i.e., a very low percolation threshold). Furthermore, these elongated particles are also of high strength and stiffness and, when dispersed in a polymer matrix, significantly reinforce the structural integrity of the matrix. This is essential to the durability of an electrode in a fuel cell that is subject to thermal and humidity cycling and mechanical impacts. This is another feature that prior art compositions (including Srinivas's) do not have.

The present invention provides another class of electro-catalysts (e.g., FIG. 5) based on a proton- and electron-conducting polymer and a transition metal, in which transition metal atoms are covalently bonded to heteroatoms of the backbone monomers of the polymer. Furthermore, the covalently bonded transition metal atoms are each a nucleation site for catalytically active transition metal nano particles. These ultra-small catalyst nano particles, typically smaller than 2 nm (some as small as single atoms or just 2-20 atoms), are highly effective catalysts for both anode and cathode reactions. The backbone polymer provides the needed bi-network of electron-conducting paths and proton-conducting paths. By contrast, the conducting polymers used by Rajeshwar, et al. [Ref. 21] and Finkelshtain, et al. [22-25] are electron-conducting only, but not proton conducting. They are subject to similar shortcomings associated with the cases of coating materials based on a proton-conducting polymer only [e.g., Ref. 1-9]: i.e., only one charge-conducting network of paths, not two, was established between the gas diffusion electrode and the PEM layer.

21. K. Rajeshwar, e al, "Conductive Polymer Films Containing Nanodispersed Catalyst Particles: A New Type of Composite Material for Technological Applications," U.S. Pat. No. 5,334,292 (Aug. 2, 1994).
22. G. Finkelsshtain, et al., "Class of Electrocatalysts and a Gas Diffusion Electrode Based Thereon for Fuel Cells," U.S. Pat. No. 6,380,126 (Apr. 30, 2002).
23. G. Finkelsshtain, et al., "Class of Electrocatalysts and a Gas Diffusion Electrode Based Thereon for Fuel Cells," U.S. Pat. No. 6,479,181 (Nov. 12, 2002).
24. G. Finkelsshtain, et al., "Class of Electrocatalysts and a Gas Diffusion Electrode Based Thereon for Fuel Cells," U.S. Pat. No. 6,730,350 (May 4, 2004).
25. G. Finkelsshtain, et al., "Class of Electrocatalysts and a Gas Diffusion Electrode Based Thereon for Fuel Cells," U.S. Pat. No. 6,878,664 (Apr. 12, 2005).

The following references appear to be somewhat relevant to the current prior art discussion:
26. Z. Qi, et al., "Electron and Proton Transport in Gas Diffusion Electrodes Containing Electronically Conductive Proton-Exchange Polymers," Journal of Electroanalytical Chemistry, 459 (1998) 9-14.
27. K. Bouzek, et al., "Utilization of Nafion/Conducting Polymer Composite in the PEM Type Fuel Cells," Journal of Applied Electrochemistry, 37 (2007) 137-145.
28. H. Lee, et al., "Performance of Polypyrrole-impregnated Composite Electrode for Unitized Regenerative Fuel Cell," Journal of Power Source, 131 (2004) 188-193.

Qi, et al. [Ref. 26] suggested that conducting polymer/polyanion composite particles can be used to replace carbon black particles for supporting Pt particles. These Pt-bearing particles might be individually proton- and electron-conductive; but, they must cluster together to form a contiguous structure to maintain an electron-conducting path and a proton-conducting path. This is not always possible when they are used to form an electrode bonded to a PEM surface or a carbon paper surface. The resulting electrode can be very fragile and subject to quick failure caused by impact, vibration, or thermal cycling when a fuel cell is in use. Further, as pointed out by Qi, et al. [26], these composite particle-based catalysts tend to exhibit "inferior performance" presumably due, in part, to the Pt particles being too large (typically just under 1 μm). The work reported by Bouzek, et al [Ref. 27] and that by Lee, et al. [Ref. 28] are both based on an electron-conducting polymer (polyaniline and polypyrolle, respectively) coated on (or slightly impregnated into) a surface of a Nafion-type PEM electrolyte layer, forming a two-layer PEM structure. Bouzek, et al. [Ref. 27] showed that there was no advantage of using such a two-layer structure although Lee, et al. [Ref. 28] observed some limited improvements over conventional Nafion-supported catalyst electrode. Presumably, these electrode structures do not provide the required bi-networks of charge transport paths. They could also limit the transport of fuels (particularly when larger-than-hydrogen molecules such as alcohol are involved) at the anode and interfere with the removal of water from the cathode.

The present invention overcomes most of the drawbacks and shortcomings of the prior art electrodes by providing an innovative class of electro-catalyst composition that features a much more effective utilization of the catalyst, particularly through the optimization of electron and ion transfer rates, a significant reduction in the nano catalyst particle size, and an optimal dispersion of catalyst particles in three dimensions. The resulting electrode effectively establishes proton-conducting paths, electron-conducting paths, and fuel/oxidant transport paths that enable the same amount of electro-catalyst to induce a higher rate of electrochemical conversion in a fuel cell resulting in significantly improved performance as compared to all of the prior art electro-catalysts known to us.

SUMMARY OF THE INVENTION

The present invention provides an electro-catalyst composition for use in a fuel cell. In one preferred embodiment, the composition comprises: (a) a proton- and electron-conducting polymer having at least one heteroatom per backbone monomer unit thereof and a plurality of neutral transition metal atoms covalently bonded to at least a portion of the heteroatoms; wherein the polymer has an electronic conductivity no less than $10^{-4}$ S/cm and a proton conductivity no less than $10^{-5}$ S/cm. Preferably, the composition further comprises (b) a plurality of catalytically active particles of a transition metal, nucleated around these covalently bonded transition metal atoms. Optionally, the composition may further comprise (c) a plurality of catalytically active particles of a transition metal physically dispersed in this polymer. Further preferably, the catalytically active particles of a transition metal (in either (b) or (c)) have an average dimension smaller than 2 nanometers, most preferably smaller than 1 nanometer. This electro-catalyst polymer composition may be coated onto two primary surfaces of a PEM layer or coated/bonded to a surface of a gas diffusion layer (GDL) to form an electrode (anode and/or cathode). The composition forms a thin-film electrode that preferably comprises pores that are interconnected to facilitate fuel or oxidant gas diffusion. In one particularly preferred embodiment, the electro-catalyst composition is allowed to impregnate into a GDL from one side (the side facing the PEM layer) and, further preferably, also allowed to be coated/bonded to a surface (the one facing the GDL) of this PEM.

The backbone polymer may be selected from sulfonated polyaniline, sulfonated polypyrrole, sulfonated polythiophene, sulfonated polyfuran, sulfonated bi-cyclic polymers, derivatives thereof, and combinations thereof. The transition metal atoms may include atoms selected from the group consisting of platinum, iridium, osmium, rhenium, ruthenium, rhodium, palladium, iron, cobalt, nickel, chromium, manganese, copper, and vanadium.

The incorporation of such an ion- and proton-conducting heterogeneous catalyst polymer (containing covalently bonded transition metal atoms and nano particles) in an electrode enables a fuel cell electrode to consist of bi-networks of charge transport paths (one for electrons and the other for proton). Optionally, substantially interconnected pores may be formed in the electrode to help form a diffusion path for the fuel (e.g., hydrogen) or oxidant (e.g., oxygen). In this way, the whole electrode structure is basically an intertwine 3-D network of three paths for electrons, protons, and electro-chemical reactants, respectively. The incorporation of such an electro-catalyst composition in a fuel cell electrode, catalyst-coated membrane, or membrane electrode assembly leads to much improved fuel cell performance with much reduced Ohmic loss, higher catalyst utilization efficiency, and higher cell output voltage (given the same desired operating current density).

BRIEF DESCRIPTION OF THE DRAWINGS

FIG. 3 A three-material model for a local catalyst-electrolyte-carbon fiber region in a prior-art fuel cell electrode.

DETAILED DESCRIPTION OF THE PREFERRED EMBODIMENTS

A hydrogen-oxygen PEM-FC using hydrogen gas as the fuel and oxygen as the oxidant may be represented by the following electro-chemical reactions:

Anode: $H_2 \rightarrow 2H^+ + 2e^-$  (Eq. (1))

Cathode: $\tfrac{1}{2}O_2 + 2H^+ + 2e^- \rightarrow H_2O$  (Eq. (2))

Total reaction: $H_2 + \tfrac{1}{2}O_2 \rightarrow H_2O$  (Eq. (3))

Figure 1A:
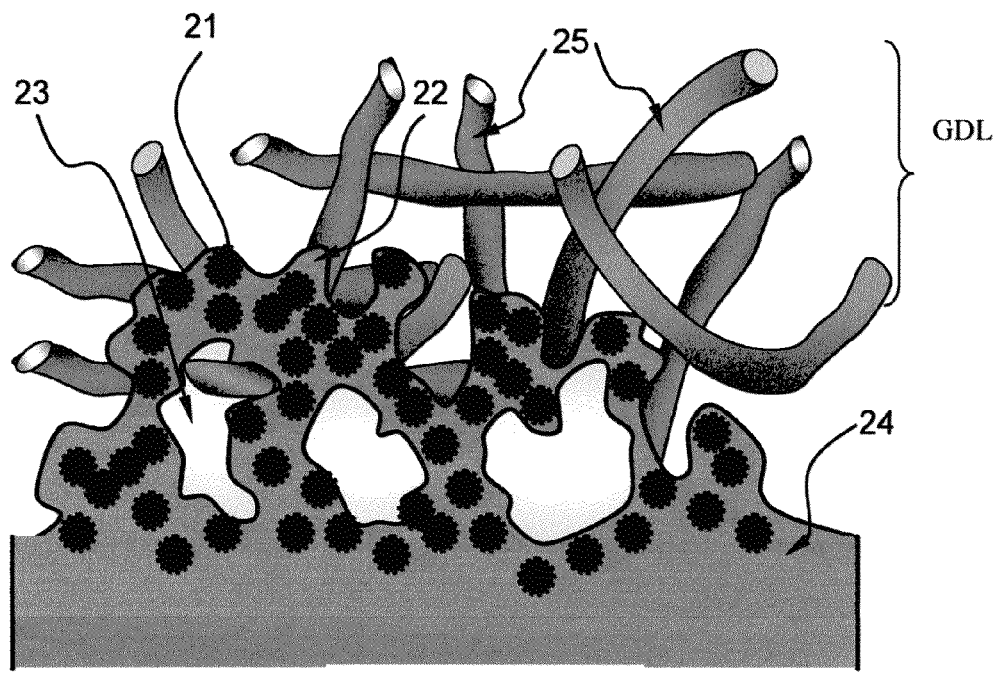
FIG. 1 (a) Schematic of a prior-art PEM fuel cell electrode structure; (b) Schematic of another prior-art PEM fuel cell electrode structure.

Both electrode reactions proceed only on a three-phase interface which allows the reception of gas (hydrogen or oxygen) and the delivery or reception of proton ($H^+$) and electron ($e^-$) at the same time. An example of the electrode having such a function is a solid polymer electrolyte-catalyst composite electrode comprising a solid polymer electrolyte and catalyst particles. FIG. 1(a) schematically shows the structure of such a prior art electrode. This electrode is a porous electrode comprising catalyst particles 21 and a solid polymer electrolyte 22 three-dimensionally distributed in admixture and having a plurality of pores 23 formed thereinside. The catalyst particles form an electron-conductive channel, the solid electrolyte forms a proton-conductive channel, and the pores form a channel for the supply and discharge of oxygen, hydrogen or water as product. Ideally, the three channels are three-dimensionally distributed and numerous three-phase interfaces which allow the reception or delivery of gas, proton ($H^+$) and electron ($e^-$) at the same time are formed in the electrode, providing sites for electrode reaction. In this diagram, reference numeral 24 represents an ion-exchange membrane (typically the same material as the solid polymer electrolyte 22 in all prior art electrode structures) while numeral 25 represents carbon or graphite fibers in a sheet of carbon paper as a catalyst backing layer.

The preparation of an electrode having such a structure has heretofore been accomplished typically by a process that comprises (a) preparing a paste of catalyst particles and, optionally, poly tetrafluoroethylene (PTFE) particles dispersed in a liquid, (b) applying (dispensing, depositing, spraying, or coating) the paste to a surface of a PEM or a porous carbon electrode substrate (carbon paper) of an electro-conductive porous material to make a catalyst film (normally having a layer thickness of from 3 to 30 μm), (c) heating and drying the film, and (d) applying a solid polymer electrolyte solution to the catalyst film so that the film is impregnated with the electrolyte. Alternatively, the process comprises applying a paste made of catalyst particles, PTFE particles, and a solid polymer electrolyte solution to a PEM or a porous carbon electrode substrate to make a catalyst film and then heating and drying the film. The solid polymer electrolyte solution may be obtained by dissolving the same composition as the aforementioned ion-exchange membrane (PEM) in an alcohol. PTFE particles are typically supplied with in a solution with the particles dispersed therein. PTFE particles typically have a particle diameter of approximately 0.2-0.3 μm. Catalyst particles are typically Pt or Pt/Ru nano particles supported on carbon black particles.

In actual practice, the aforementioned solid polymer electrolyte-catalyst composite electrode has the following drawbacks: The solid polymer electrolyte-catalyst composite electrode has a high electrical resistivity, which may be explained as follows. When catalyst particles are mixed with solid polymer electrolyte solution to prepare a paste, the catalyst particles are covered with solid polymer electrolyte film having extremely low electronic conductivity ($10^{-16}$-$10^{-13}$ S/cm). Upon completion of a film-making process to prepare an electrode, pores 32 and the non-conductive solid polymer electrolyte 33 tend to separate or isolate catalyst particles 33. The formation of a continuous catalyst particle passage (electron-conducting channel) is inhibited or interrupted, although a continuous solid electrolyte passage (proton-conducting channel) is maintained, as shown in the sectional view of electrode of FIG. 1(b).

Figure 1B:
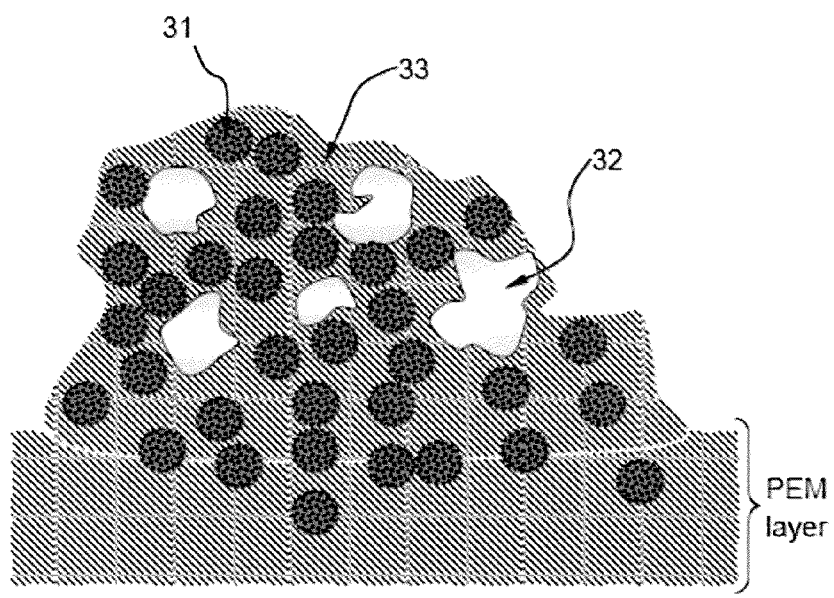
Figure 2:
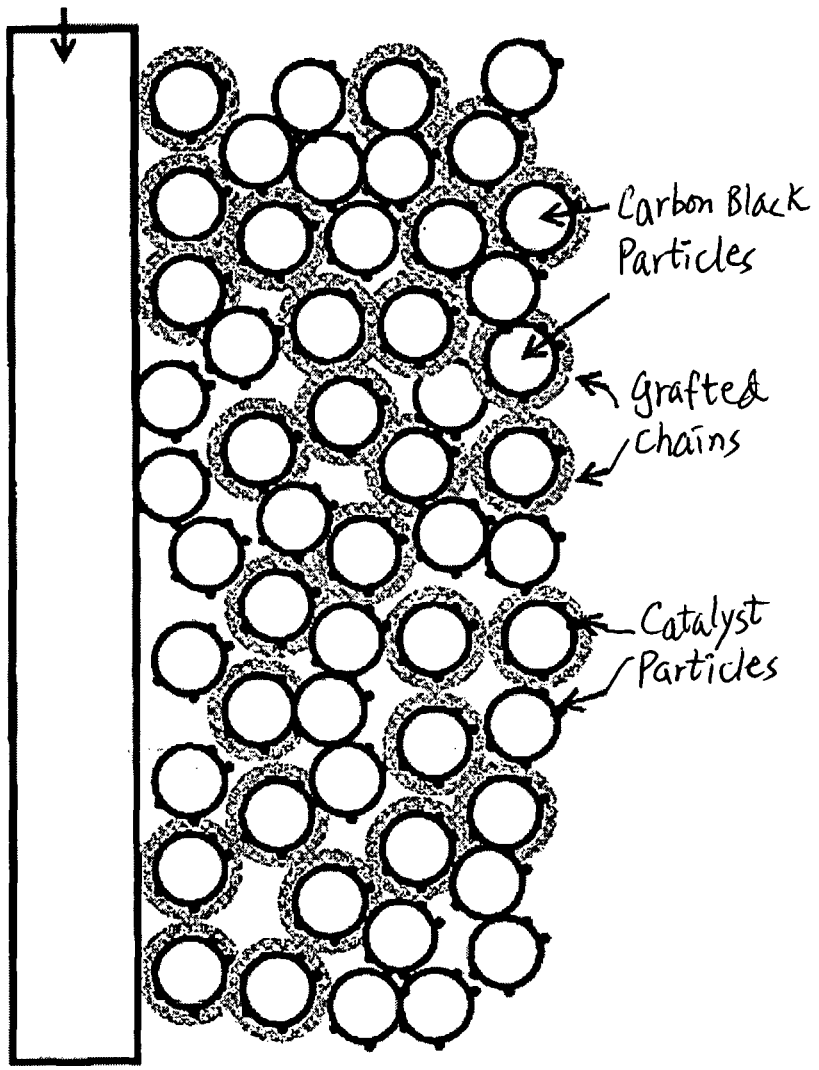
FIG. 2 Prior-art electro-catalyst composition composed of grafted carbon black particles packed to form a weak aggregate (e.g., as shown in FIG. 1(B) of B. Srinivas and A. O. Dotson, US 2004/0109816 (Pub. Jun. 10, 2004)).

Furthermore, by pressing the catalyst-electrolyte composite composition layer against the PEM layer to make a catalyst-coated membrane (CCM) and then a membrane electrode assembly (MEA), a significant amount of the carbon-supported catalyst particles tend to be embedded deep into the PEM layer (as illustrated by the bottom portion of FIG. 1(b)), making them inaccessible by electrons (if used as a cathode) or incapable of delivering electrons to the anode current collector (if used as an anode). As a result, the overall utilization percentage of carbon-supported catalyst is significantly reduced.

As shown in the upper portion of FIG. 1(a), the electronically non-conducting solid electrolyte 22 also severs the connection between the otherwise highly conductive catalyst-supporting carbon particles 21 and the carbon fibers 25 in the electrode-catalyst backing layer (e.g., carbon paper, which is also a gas diffusion layer, GDL). This problem of solid electrolyte being interposed between a carbon particle and a carbon fiber is very significant and has been largely ignored by fuel cell researchers. The degree of severity of this problem is best illustrated by considering a three-layer model shown in FIG. 3. The model consists of top, core, and bottom layers that are electrically connected in series. The top layer represents a carbon fiber material, the bottom layer a carbon black particle material, and the core layer a solid electrolyte material. The total resistance ($R_s$), equivalent resistivity ($\rho_s$), and conductivity ($\sigma_s$) of the three-layer model can be easily estimated. For the top layer (carbon fiber), the properties or parameters are given as follows: conductivity ($\sigma_1$), resistivity ($\rho_1$), resistance ($R_1$), and thickness ($t_1$). Similar notations are given for the other two layers with subscript being "2" and "3", respectively. FIG. 3 shows that the equivalent conductivity of the resulting three-layer model is $\sigma_s=(t_1+t_2+t_3)/(\rho_1 t_1+\rho_2 t_2+\rho_3 t_3)$. With $t_1=10$ μm, $t_2=1$ μm, and $t_3=30$ nm (0.03 μm), $\rho_1=10^{-1}$ Ω·cm, $\rho_2=10^{+4}$ Ω·cm, and $\rho_3=10^{+2}$ Ω·cm, we have $\sigma_s\approx 10^{-13}$ S/cm. Assume that the electrolyte layer has a thickness as low as 1 nm (0.001 μm), the equivalent conductivity would be still as low as $\sigma_s\approx 10^{-10}$ S/cm. It is clear that the equivalent conductivity of the local electrode environment (three-component model) is dictated by the low conductivity or high resistivity of the solid electrolyte (22 in FIG. 1(a) and 33 in FIG. 1(b)). These shockingly low conductivity values ($10^{-13}$ to $10^{-10}$ S/cm) clearly have been overlooked thus far by all of the fuel cell researchers. It could lead to significant power loss (Ohmic resistance) in a fuel cell and undesirable local heating that tends to degrade the PEM layer.

Figure 4A:
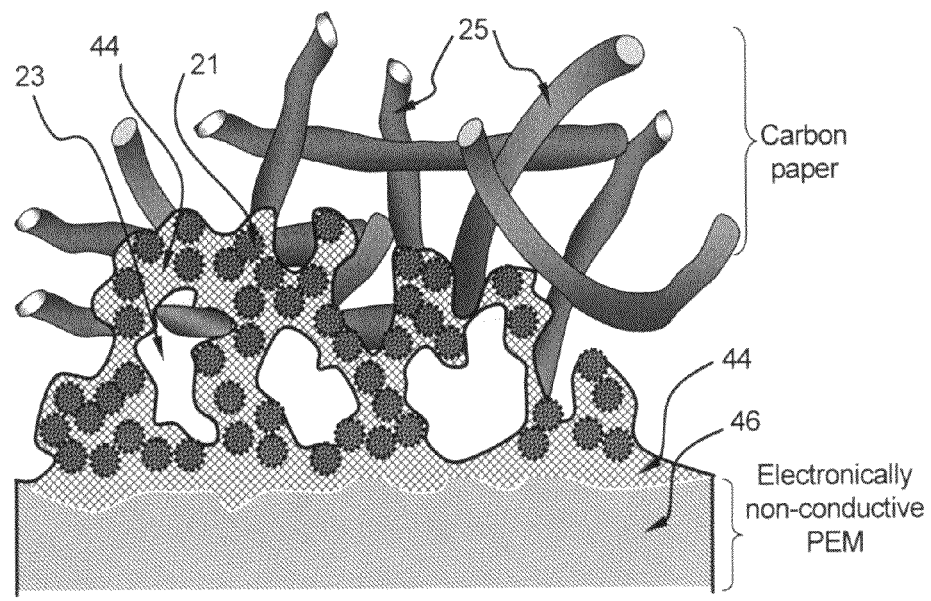
FIG. 4 (a) Schematic of an electrode structure according to one of our earlier inventions, (b) Schematic of an electrode structure according to another one of our earlier inventions.
Figure 4B:
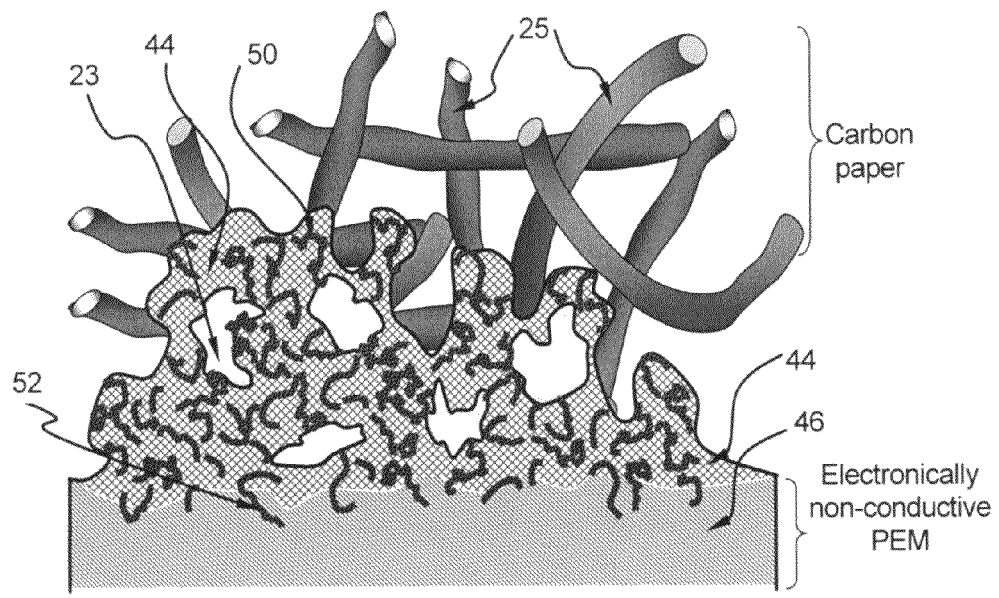

To effectively address the aforementioned issues associated with electro-catalysts in a fuel cell in general and a PEM-type fuel cell (hydrogen-fed or direct alcohol fuel cell such as direct methanol fuel cell, DMFC) in particular, we decided to take a novel approach to the formulation of electro-catalysts. Rather than using the same solid electrolyte material as the PEM layer (which is ion-conductive but must be electronically non-conductive), we used a solid electrolyte material, which is both electron-conductive and ion-conductive, to serve as a matrix material to embed catalyst particles, which are un-supported or supported on conductive particles such as carbon black (e.g., FIG. 4(a)) or nano-scaled graphene platelets (FIG. 4(b)). The solid electrolyte layer (e.g., PEM as indicated by numeral 24 in FIG. 1(a), or other organic or inorganic, ion-conductive solids) interposed between the anode and the cathode remain proton-conductive, but not electron-conductive. This technology has been disclosed in four co-pending applications mentioned earlier [Ref. 17-20].

The present application provides yet another class of electron- and proton-conducting polymer based electro-catalyst compositions for PEM and direct alcohol fuel cell applications. One of the preferred embodiments of the present invention is an electro-catalyst composition comprising: (a) a proton- and electron-conducting polymer having at least one heteroatom per backbone monomer unit thereof and a plurality of neutral transition metal atoms covalently bonded to at least a portion of said heteroatoms (e.g., Formula 3 shown in FIG. 5); wherein the polymer has an electronic conductivity no less than $10^{-4}$ S/cm and a proton conductivity no less than $10^{-5}$ S/cm. Preferably, the electro-catalyst composition further comprises (b) a plurality of catalytically active particles of a transition metal, which are nucleated around these covalently bonded transition metal atoms.

Figure 5:
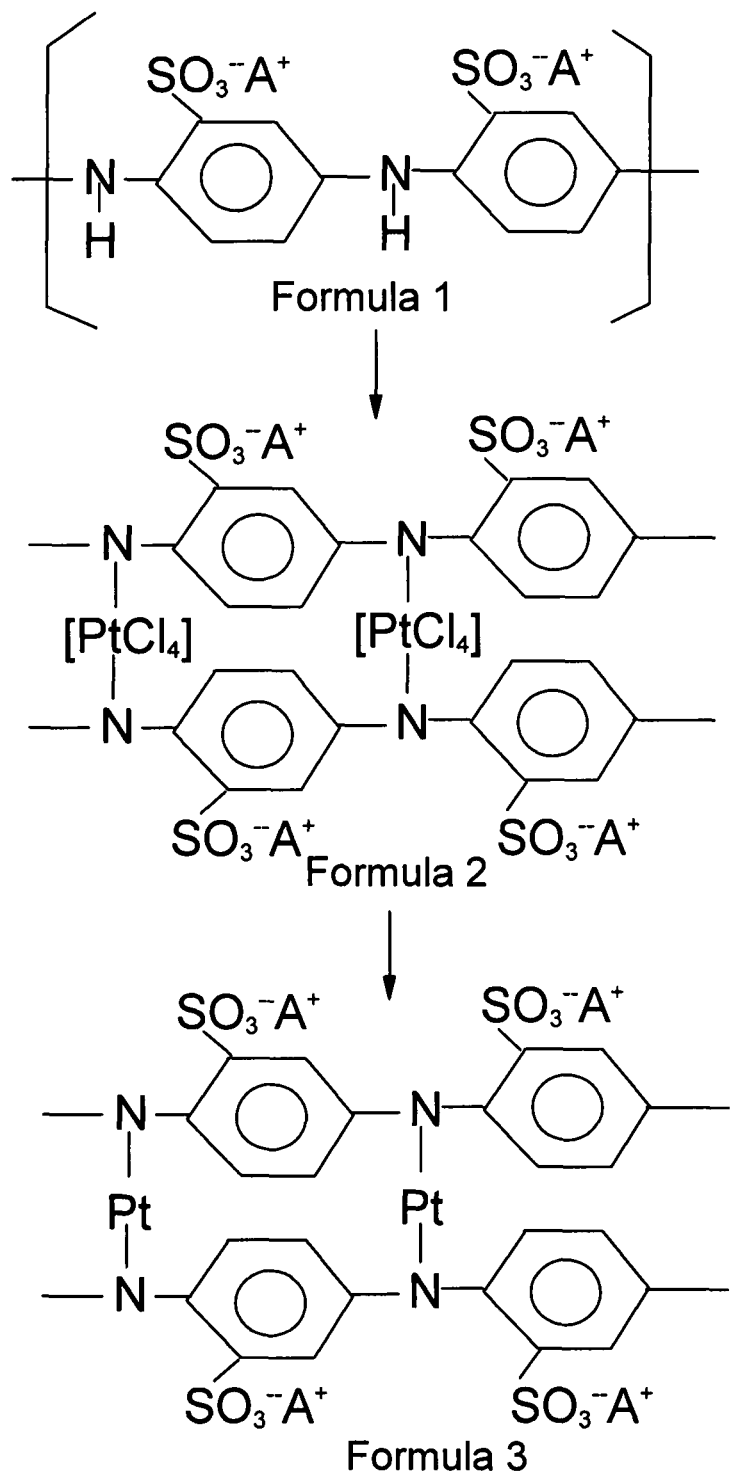
FIG. 5 Schematic of a preferred procedure for producing an electro-catalyst composition according to one of the preferred embodiments of the present invention.

In one preferred embodiment, a method for producing an electro-catalyst composition is schematically shown in FIG. 5, which includes the steps of: (a) complexing a highly electron- and proton-conducting polymer (e.g., Formula 1 in FIG. 5) with a plurality of transition metal coordination complexes (e.g., $H_2PtCl_6$) to produce a polymer-transition metal complex (e.g. Formula 2 of FIG. 5); and (b) reducing the polymer-transition metal complex to place the transition metal in a neutral oxidation state (Formula 3 in FIG. 5). A method for incorporating such an electro-catalyst composition in a fuel cell includes the above-described steps (a) and (b), further comprising (c) dispersing the reduced polymer-transition metal complex in a solvent; and (d) impregnating an electrically conducting gas diffuser layer (GDL) with the dispersion. Alternatively, the dispersion may be deposited onto one primary surface or two opposing primary surfaces of a proton exchange membrane (PEM) layer, such as Nafion, via brushing, spin-casting, printing, or coating.

The conducting polymer-transition metal complex of the present invention is preferably prepared by complexing the proton- and electron-conducting polymer with coordination complexes of the transition metal (e.g., using $H_2PtCl_6$, $H_2IrCl_6$, and $Co(ClO_4)_2\cdot 6H_2O$ in the cases of sulfonated polyaniline or polypyrrole), and then reducing the transition metal cations of the resulting polymer-transition metal coordination complex to a neutral oxidation state. Preferably, the reduction is effected by mixing the complex with an aqueous solution of a reductant such as sodium borohydride, formaldehyde, and hydrazine. Examples are given at a later section of this application to illustrate the preferred procedures and processing conditions for these steps.

The electrode material composition of the present invention is in some way similar to the composition of Rajeshwar et al. [Ref. 21], but has smaller catalytic particles, some possibly as small as single atoms of a transition metal, dispersed within a matrix of a conducting polymer having heteroatoms in its backbone monomers. It is also similar to the electro-catalyst compositions described by Finkelshtain, et al. [Ref. 22-25], in which an electron-conducting (but not proton-conducting) polymer is used as the backbone. However, our polymers, being both electron-conducting and proton-conducting, exhibit a superior voltage-current response, presumably due to a much lower Ohmic loss and much higher catalyst utilization efficiency. The preferred backbone polymers include sulfonated polyaniline, sulfonated polypyrrole, sulfonated polythiophene and sulfonated polyfuran. The preferred transition metals include platinum, iridium, osmium, rhenium, ruthenium, rhodium, palladium, iron, cobalt, nickel, chromium, manganese, copper and vanadium. The most preferred polymers are sulfonated polyaniline, sulfonated pyrrole-based polymers, and sulfonated alkyl thiophene-based polymers. The most preferred transition metals are platinum, palladium, and iridium. The transition metal catalytic particles appear to be nucleated around single transition metal atoms that are covalently bonded to some of the backbone heteroatoms of the electron- and proton-conducting backbone polymers. They typically have an average dimension of less than 2 nm. When an additional amount of molecular precursors to a transition metal was used, the excess transition metal atoms clustered to form ultra-small nano catalyst particles (surprisingly most of them being smaller than 1 nm) that were physically dispersed in the polymer matrix.

Such a catalyst composition, comprising truly nano-scaled catalyst particles (preferably smaller than 2 nm in diameter and most preferably smaller than 1 nm) bonded to and dispersed in the proton- and electron-conductive polymer, can be attached to, coated on, or impregnated into a porous carbon paper (a GDL) on one side to form a GDL-supported electrode, or coated on two opposing surfaces of a PEM layer to form a catalyst-coated membrane, as a precursor step to form a membrane-electrode assembly (MEA).

This proton-conducting and electron-conducting polymer, with the backbone bearing heteroatoms and with a plurality of neutral transition metal atoms covalently bonded to at least a portion of the heteroatoms, is also hereinafter referred to as a heterogeneous catalyst polymer. This polymer can be used alone in an anode or cathode electrode. Alternatively, it can be mixed with another electron- and proton-conducting polymer (without the covalently bonded transition metal atoms) and/or a plurality of electro-catalyst particles (which are unsupported or supported on conducting solid particles, such as carbon blacks, nano-scaled graphene platelets, carbon nanotubes, and graphitic nano-fibers). This second electron- and proton-conducting polymer can be a homopolymer, co-polymer, polymer blend or mixture, a semi-interpenetrating network, or a polymer alloy. In the case of a blend or mixture, one component can be proton-conductive and another one electron-conductive. It is also possible that this second conducting polymer itself is conductive to both electrons and protons. Examples include sulfonated polyaniline (e.g. Formula 1), sulfonated polypyrrole, sulfonated polythiophene and sulfonated polyfuran. They do not bear any covalently bonded transition metal atoms, but they can contain some catalytic particles physically dispersed therein. Some of these polymers are more readily dissolved in a benign solvent (e.g., water and alcohol) and can serve as a matrix polymer for a composite composition.

Figure 6:
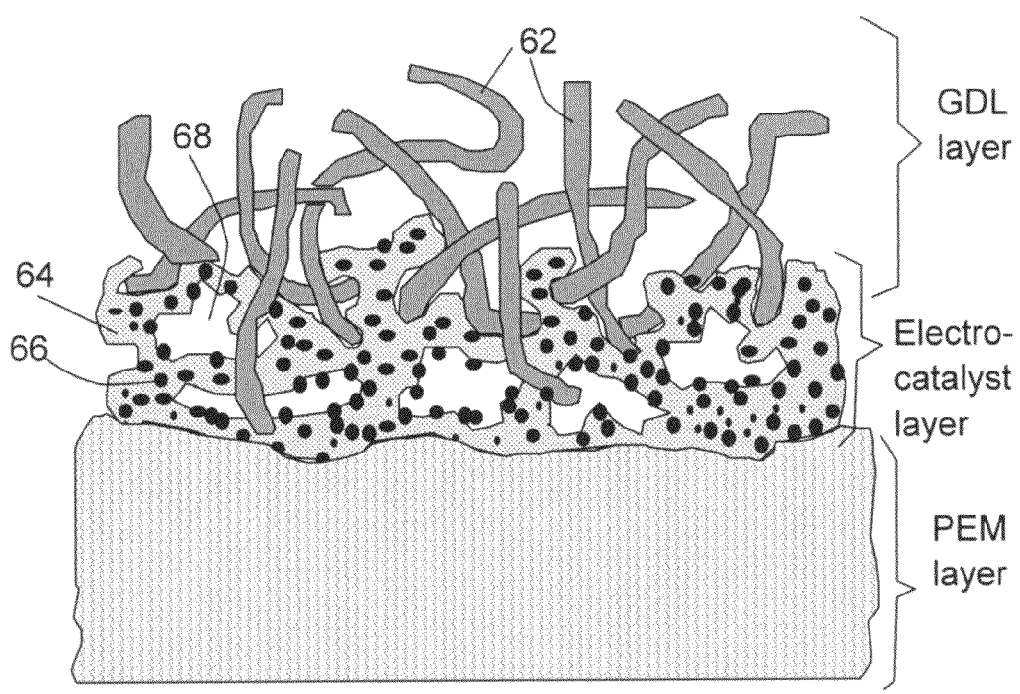
FIG. 6 Schematic of an electrode structure (prepared according to a preferred embodiment of the present invention) sandwiched between a carbon paper-based GDL layer and a PEM electrolyte layer.

With this invented catalyst composition, the resulting electrode can be used as either an anode or a cathode. As shown in FIG. 6, when it is used in an anode, hydrogen gas or organic fuel (e.g., mixture of methanol and water) can permeate to the electrode through the pores 68 (which are preferably interconnected) or diffuse through the proton- and electron-conductive material 64 (hereinafter also referred to as the matrix material), which is ultra-thin and can be readily migrated through by hydrogen via diffusion. Due to the high electronic conductivity of the matrix material 64 and additional carrier particles (if existing), the electrons produced at the catalyst particles 66 can be quickly transported through the matrix material 64 to carbon fibers 62 of a carbon paper (GDL layer) and be collected with little resistance or resistive (Ohmic) loss. The produced protons are also capable of migrating through the invented proton- and electron-conductive polymer 64 into the electronically non-conductive, but proton-conducting PEM layer, which is a conventional solid electrolyte layer interposed between an anode and a cathode.

If used as a cathode catalyst material, this conducting polymer 64 allows the electrons that come from the external load to go to the catalyst particle sites where they meet with protons and oxygen gas to form water. The protons come from the anode side, through the PEM layer, and the matrix material 64 to reach the catalyst sites. Oxygen gas migrates through the pores 68 or the polymer matrix material 64 via diffusion. Again, the electrons are capable of being transported into the cathode without any significant Ohmic loss due to the high electronic conductivity of the polymer 64.

In one preferred embodiment, the proton- and electron-conductive polymer 64 may be derived from a polymer that is by itself both proton-conductive and electron-conductive. Examples of this type polymer are sulfonated polyaniline compositions, as described by Epstein, et al. (U.S. Pat. No. 5,137,991, Aug. 11, 1992):

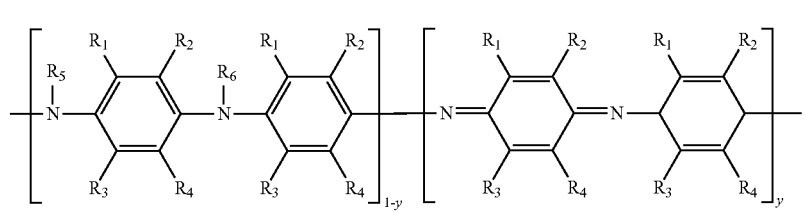

(Formula 4)

where $0 \leq y \leq 1$, $R_1$, $R_2$, $R_3$, $R_4$, $R_5$, and $R_6$ are independently selected from the group consisting of H, $SO_3^-$, $SO_3H$, $-R_7SO_3^-$, $-R_7SO_3H$, $-OCH_3$, $-CH_3$, $-C_2H_5$, $-F$, $-Cl$, $-Br$, $-I$, $-OH$, $-O^-$, $-SR_7$, $-OR_7$, $-COOH$, $-COOR_7$, $-COR_7$, $-CHO$, and $-CN$, wherein $R_7$ is a $C_1$-$C_8$ alkyl, aryl, or aralkyl group, and wherein the fraction of rings containing at least one $R_1$, $R_2$, $R_3$, or $R_4$ group being an $SO_3^-$, $SO_3H$, $-R_7SO_3^-$, or $-R_7SO_3H$ that varies from approximately 20% to 100%. Any one member of this class of sulfonated aniline-based polymer can be "complexed" with a plurality of transition metal coordination complexes (e.g., by using $H_2PtCl_6$ or $H_2PdCl_6$) to produce a polymer-transition metal complex. The resulting polymer-transition metal complex is then reduced to place the transition metal (e.g., Pt and Pd) in a neutral oxidation state to form a proton- and electron-conducting polymer containing transition metal atoms covalently bonded thereto. The sulfonated aniline polymers (Formula 4), without the covalently bonded transition metal atoms, can serve as a component of a mixture with a heterogeneous catalyst polymer, such as that represented by Formula 3, to form a mixture.

It is of interest at this juncture to re-visit the issue of ion and electron conductivities for this coating material. The proton conductivity of a conventional PEM material is typically in the range of $10^{-3}$ S/cm to $10^{-1}$ S/cm (resistivity $\rho$ of $10^1$ Ω-cm to $10^3$ Ω-cm). The thickness (t) of a PEM layer is typically in the vicinity of 100 μm and the active area is assumed to be A=100 cm². Then, the resistance to proton flow through this layer will be $R=\rho(t/A)=10^{-3}$ Ω to $10^{-1}$ Ω. Further assume that the resistance of the matrix material (the proton- and electron-conductive material) will not add more than 10% additional resistance, then the maximum resistance of the matrix material will be $10^{-4}$ Ω to $10^{-2}$ Ω. With a matrix layer thickness of 1 μm, the resistivity to proton flow cannot exceed $10^2$ Ω-cm to $10^4$ Ω-cm (proton conductivity no less than $10^{-4}$ S/cm to $10^{-2}$ S/cm). With an intended matrix layer thickness of 0.1 μm (100 nm), the proton conductivity should be no less than $10^{-5}$ S/cm to $10^{-3}$ S/cm.

Similar arguments may be used to estimate the required electronic conductivity of the matrix material. Consider that the electrons produced at the catalyst surface have to pass through an electrolyte matrix layer (0.1 μm or 100 nm thick) and a carbon paper layer (100 μm in thickness with average transverse conductivity of $10^{-1}$ S/cm to $10^{+1}$ S/cm). A reasonable requirement is for the matrix layer to produce a resistance to electron flow that is comparable to 10% of the carbon paper resistance. This implies that the electronic conductivity of the matrix material should be in the range of $10^{-3}$ S/cm to $10^{-1}$ S/cm. These values can be increased or decreased if the matrix layer thickness is increased or decreased. It may be further noted that conventional PEM materials have an electronic conductivity in the range of $10^{-16}$-$10^{-13}$ S/cm, which could produce an enormous power loss.

This was one of the motivations for us to decide to investigate the feasibility of using sulfonated polyaniline (S-PANi) materials as the backbone polymer bearing transition metal atoms covalently bonded thereto. After an extensive study, we have found that the most desirable backbone polymers for use in practicing the present invention are for $R_1$, $R_2$, $R_3$, and $R_4$ group in Formula 4 to be H, $SO_3^-$ or $SO_3H$ with the latter two varied between 30% and 75% (degree of sulfonation varied between 30% and 75%). The proton conductivity of these $SO_3^-$— or $SO_3H$-based S-PANi compositions increases from $3\times10^{-3}$ S/cm to $4\times10^{-2}$ S/cm and their electron conductivity decreases from 0.5 S/cm to 0.1 S/cm when the degree of sulfonation is increased from approximately 30% to 75% (with y being approximately 0.4-0.6). These ranges of electron and proton conductivities are reasonable, particularly when one realizes that only a very thin film of S-PANi is used (typically much thinner than 1 μm). After going through complexing and subsequent reduction procedures (e.g., as schematically shown in FIG. 5), the electron conductivity remains in the range of 0.1 S/cm to 0.5 S/cm and the proton conductivity falls slightly into the range of approximately $1\times10^{-3}$ S/cm to $3\times10^{-2}$ S/cm. This latter observation appears to suggest that some of the Pt or Pd atoms are bonded directly to the benzene ring or cyclic structure (e.g., at what used to be the $SO_3^-$-positions). Further, when a super-stoichiometric amount of the complexing agent (e.g., $H_2PtCl_6$) is used in the process, the excess Pt atoms can be physically dispersed in the heterogeneous catalyst polymer matrix. This is a surprisingly good method to disperse electro-catalyst particles in a polymer matrix to form a highly efficient catalytic electrode for fuel cell applications. This method allows for the dispersion of expensive noble or rare metals, such as Pt, Ir, and Pd, in the form of nano particles (with most of the particles smaller than 2 nm and a significant proportion of these particles smaller than 1 nm). This affords the most efficient utilization of catalytic metals) in terms of not only the reduced catalyst particle sizes (hence, much greater surface-to-volume ratios for enhanced catalytic effects), but also the good electron- and proton-conductivities that ensure essentially all the generated electrons and protons are fully utilized.

Another extremely surprising result of this study, which has highly significant implications in the fuel cell industry, is the observation that ultra-small nano catalyst particles (<1 nm) of much less expensive metals, such as Co, Ni, and Fe, can be readily dispersed in an electron- and proton-conducting polymer matrix. These ultra-fine nano particles are nucleated around the covalent-bonded atoms or simply dispersed in the polymer. These ultra-small nano particles are as effective as the more expensive Pt in terms of serving as a catalyst for both hydrogen-fed and direct alcohol PEM fuel cells. Given the fact that electro-catalysts are known to contribute to 30-40% of the current cost of a PEM fuel cell stack and there has been tremendous R&D efforts on the part of fuel cell industry and academic research communities on the development of platinum-free electro-catalysts (so far without much success), this new discovery clearly has a great utility value and will have a dramatic impact on the industry's attempts to have a widespread implementation of fuel cells, particularly for vehicle power applications.

A polymer of this nature can be used alone as a proton- and electron-conductive material. We have further found that these polymers are soluble in a wide range of solvents. Prior to or after complexing and reduction, these polymers are chemically compatible (miscible and mixable) with the commonly used proton-conductive polymers such as those represented by Formula 7, to be described later. Hence, these S-PANi polymers, without complexing, can be used in combination with a proton-conducting polymer to form a second electron- and proton-conducting polymer mixture to further mix with a heterogeneous catalyst polymer such as Formula 3.

The aforementioned class of S-PANi was prepared by sulfonating selected polyaniline compositions after polymer synthesis. A similar class of soluble aniline polymer could be prepared by polymerizing sulfonic acid-substituted aniline monomers. The synthesis procedures are similar to those suggested by Shimizu, et al. (U.S. Pat. No. 5,589,108, Dec. 31, 1996). The electronic conductivity of this class of material was found by Shimizu, et al. to be between 0.05 S/cm and 0.2 S/cm, depending on the chemical composition. However, proton conductivity was not measured or reported by Shimizu, et al. We have found that the proton conductivity of this class of polymers typically ranges from $4\times10^{-3}$ S/cm to $5\times10^{-2}$ S/cm, depending on the degree of sulfonation. It appears that both proton and electron conductivities of these polymers are well within acceptable ranges to serve as a proton- and electron-conductive polymer for use in the presently invented fuel cell catalyst compositions. Again, these polymers are soluble in a wide range of solvents and are chemically compatible (miscible and mixable) with commonly used proton-conductive polymers such as those represented by Formula 7, to be described later. Hence, these polymers not only can be used alone as a proton- and electron-conductive polymer, but also can be used an electron-conductive polymer component that forms a mixture with a proton-conductive polymer.

The needed proton- and electron-conducting matrix polymer can be a mixture or blend of an electrically conductive polymer and a proton-conductive polymer with their ratio preferably between 20/80 to 80/20. The electron-conductive polymer component can be selected from any of the π electron conjugate chain polymers, doped or un-doped, such as derivatives of polyaniline, polypyrrole, polythiophene, polyacetylen, and polyphenylene provided they are melt- or solution-processable. A class of soluble, electron-conductive polymers that can be used as one component of an electron- and proton-conducting polymer mixture in the present invention has a bi-cyclic chemical structure represented by Formula 5:

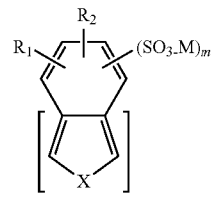

(Formula 5)

wherein $R_1$ and $R_2$ independently represent a hydrogen atom, a linear or branched alkyl or alkoxy group having 1 to 20 carbon atoms, a primary, secondary or tertiary amino group, a trihalomethyl group, a phenyl group or a substituted phenyl group, X represents S, O, Se, Te or $NR_3$, $R_3$ represents a hydrogen atom, a linear or branched alkyl group having 1 to 6 carbon atoms or a substituted or unsubstituted aryl group, providing that the chain in the alkyl group of $R_1$, $R_2$, or $R_3$, or in the alkoxy group of $R_1$ or $R_2$ optionally contains a carbonyl, ether or amide bond, M represents $H^+$, an alkali metal ion such as $Na^+$, $Li^+$, or $K^+$ or a cation such as a quaternary ammonium ion, and m represents a numerical value in the range between 0.2 and 2. This class of polymers was developed for the purpose of improving solubility and processability of electron-conductive polymers (Saida, et al., U.S. Pat. No. 5,648,453, Jul. 15, 1997). These polymers are also soluble in a wide range of solvents (including water) and are chemically compatible (miscible and mixable) with the proton-conductive polymers represented by Formula 7, to be described later. These polymers exhibit higher electronic conductivity when both $R_1$ and $R_2$ are H, typically in the range of $5 \times 10^{-2}$ S/cm to 1.4 S/cm. These polymers are also proton-conductive (proton conductivity of $5 \times 10^{-4}$ S/cm to $1.5 \times 10^{-2}$ S/cm) and hence can be used in the presently invented catalyst composition, alone or in combination with another proton-conductive or electron-conductive polymer. In addition, with S=NH, $R_1$=$R_2$=H, for instance, the polymer of Formula 5 can be used as the backbone polymer to produce the heterogeneous catalyst polymer via complexing and reduction.

Polymers which are soluble in water and are electronically conductive may be prepared from a monomer that has, as a repeat unit, a thiophene or pyrrole molecule having an alkyl group substituted for the hydrogen atom located in the beta position of the thiophene or pyrrole ring and having a surfactant molecule at the end of the alkyl chain (Aldissi, et al., U.S. Pat. No. 4,880,508, Nov. 14, 1989):

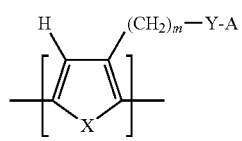

(Formula 6)

In these polymers, the monomer-to-monomer bonds are located between the carbon atoms which are adjacent to X, the sulfur or NH group. The number (m) of carbon atoms in the alkyl group may vary from 1 to 20 carbon atoms. The surfactant molecule consists of a sulfonate group (Y=$SO_3$) or a sulfate group (Y=$SO_4$) and A may be chosen from the group consisting of hydrogen (H) or an alkali metal (Li, Na, K, etc.). Synthesis of these polymers may be accomplished using the halogenated heterocyclic ring compounds 3-halothiophene or 3-halopyrrole as starting points; these are available from chemical supply houses or may be prepared by method known to those skilled in the art. The electronic conductivity of these polymers is typically in the range of $10^{-3}$ S/cm to 50 S/cm. These polymers can be a component of a polymer mixture that is both electron- and proton-conducting.

It may be noted that with X=NH and Y=$SO_3^-$, Formula 6 is a sulfonated pyrrole-based polymer that is both electron- and proton-conducting. With X=S and Y=$SO_3^-$, Formula 6 is a sulfonated thiophene-based polymer that is both electron- and proton-conducting. Either pyrrole- or thiophene-based polymer can be converted to the heterogeneous catalyst polymer by the presently invented complexing and reduction procedures. These two polymers and their derivatives are of particular interest due to their high solubility in water and alcohol, enabling easy and convenient preparation of the final heterogeneous catalyst polymer containing covalently bonded transition metal atoms and, optionally, additional catalytic metal nano particles physically dispersed in the polymer. This is important since the preferred complexing agents, such as $H_2PtCl_6$ and $H_2IrCl_6$, are readily available in an water solution. All complexing and reduction reactions can occur in water with the resulting heterogeneous catalyst polymer well dissolved or dispersed in water. The resulting solution or suspension can be easily deposited to one side of a GDL carbon paper/cloth or both surfaces of a PEM film. It may be further noted that certain amount of $PtCl_4$ may occupy the beta position of the thiophene or pyrrole ring (instead of, or in addition to, the covalent bonded transition metal atom positions between two neighboring S atoms (thiophene-based) or between two neighboring N atoms (pyrrole-based)).

The proton-conductive polymer component of a mixture can be any polymer commonly used as a solid polymer electrolyte in a PEM-type fuel cell. These PEM materials are well-known in the art. One particularly useful class of ion-conductive polymers is the ion exchange membrane material having sulfonic acid groups. These materials are hydrated when impregnated with water, with hydrogen ion $H^+$ detached from sulfonic ion, $SO_3^{-1}$. The general structure of the sulfonic acid membranes that have received extensive attention for use in fuel cells and are sold under the trade name Nafion® by E.I. du Pont Company is as follows:

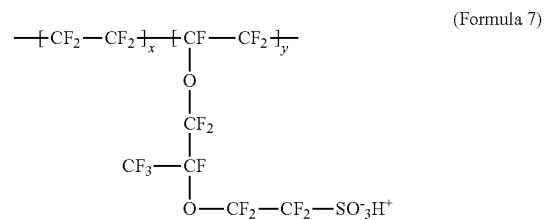

(Formula 7)

where x and y are integers selected from 1 to 100,000, preferably from 1 to 20,000, most preferably from 100 to 10,000.

The above polymers have a detachable hydrogen ion (proton) that is weakly attached to a counter-ion (e.g., $SO_3^-$), which is covalently bonded to a pendant group of the polymer. While the general structures shown above are representative of several groups of polymers of the present invention, they are not intended to limit the scope of the present invention. It would become obvious to those skilled in the art, from the relationships presented herein that other sulfonic acid functional polymers having pendant chains, sterically hindered sulfonate groups or the like would absorb some water and conduct protons. For instance, the derivatives and copolymers of the aforementioned sulfonic acid polymers, alone or in combination with other polymers to form polymer blends, may also be used as an ion-conductive material in the invented fuel cell catalyst composition. The aforementioned polymers were cited as examples to illustrate the preferred mode of practicing the present invention. They should not be construed as limiting the scope of the present invention.

In summary, the proton-conducting polymer component of the desired mixture may be selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof. These materials have been used as solid electrolyte materials for various PEM-based fuel cells due to their relatively good proton conductivity (typically between 0.1 S/cm and 0.001 S/cm).

Any one of these proton-conducting materials can be mixed with an electron-conducting polymer to make a polymer blend or mixture that is the so-called second electron- and proton-conducting polymer component. Such a mixture (and its mixture with a heterogeneous catalyst polymer like Formula 3) may be prepared preferably by dissolving two (or three) polymers in a common solvent to form a polymer solution. When a heterogeneous polymer is used, there are catalyst atoms already bonded to the polymer backbone, along with transition metal particles nucleated around these atoms to serve as catalysts.

If necessary, additional catalyst particles (e.g., nano-scaled Pt particles already supported on the surface of NGP particles, or Pt particles and NGP particles separately) are then added to this polymer solution to form a suspension. Other conducting carriers include carbon black, carbon nano fibers, carbon nanotubes, carbon nano-scrolls, etc. Alternatively, catalyst particles may be dispersed in a liquid to obtain a suspension, which is then poured into the polymer solution to form a precursor catalyst composition. Nano-scaled catalyst particles may be selected from commonly used transition metal-based catalysts such as Pt, Pd, Ru, Mn, Co, Ni, Fe, Cr, and their alloys or mixtures. They are commercially available in a fine powder form or in a liquid with these nano-scaled particles dispersed therein. Other types of catalyst, including oxides of transition metals and organo-metallic compound, may be used as a component in the presently invented precursor composite electro-catalyst composition provided that they or their precursors can be dissolved or dispersed in a liquid. Mixing between a proton-conductive polymer and an electron-conductive polymer may also be accomplished by melt mixing or melt extrusion. In summary, additional nano catalyst particle-bearing conductive particles may be dispersed in the presently invented polymer, wherein the conductive particles are selected from carbon black, nanometer-thickness graphite platelets, carbon nano-fibers, graphitic nano-fibers, carbon nanotubes, carbon nano-scrolls, or a combination thereof.

A suspension can be prepared in this manner to contain only an electron-conductive and proton-conductive polymer (or a mixture of two or three polymers) dissolved or dispersed in a solvent. Such a catalyst-free suspension is also a useful material that can be coated to a primary surface of a carbon paper or a primary surface of a solid PEM layer. This is followed by depositing a thin film of the presently invented composite electro-catalyst composition from a precursor suspension onto either the carbon paper or the PEM layer. Such a catalyst-free coating serves to ensure that the coated catalysts will have a complete electronic connection with the carbon paper and complete ionic connection with the PEM layer. The resulting electrode is characterized in that the elongated carrier particles along with the supported Pt nanoparticles are not surrounded by the electronically non-conductive PEM polymer after lamination to form a membrane-electrode assembly.

EXAMPLE 1

Synthesis, Complexing and Reduction of Sulfonated Polyaniline (S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by Formula 4 with $R_1, R_2, R_3$, and $R_4$ group being H, $SO_3^-$ or $SO_3H$ with the content of the latter two being varied between 30% and 75% (i.e., the degree of sulfonation varied between 30% and 75%). The proton conductivity of these $SO_3^-$ or $SO_3H$-based S-PANI compositions was in the range of $3\times10^{-3}$ S/cm to $4\times10^{-2}$ S/cm and their electron conductivity in the range of 0.1 S/cm to 0.5 S/cm when the degree of sulfonation was from approximately 30% to 75% (with y being approximately 0.4-0.6).

Subsequently, 6.78 g of sulfonated polyaniline (with $R_1\!=\!SO_3^-$, and $R_2\!=\!R_3,\!=\!R_4\!=\!H$ in Formula 1) and 100 ml of distilled water were mixed in an Erlenmeyer flask for 30 minutes to prepare an aqueous solution/suspension of sulfonated polyaniline. Then, 110 ml of 0.98% aqueous $H_2PtCl_6$ were slowly added to this solution/suspension for a duration of 60 minutes while stirring constantly to produce a solution/suspension of sulfonated polyaniline-$PtCl_4$ complex.

A reductant solution was prepared by dissolving 1.5 g $NaBH_4$ and 0.7 g NaOH in 100 ml of distilled water at room temperature and stirring the mixture for 30 minutes. The sulfonated polyaniline-$PtCl_4$ complex was placed in an Erlenmeyer flask, and the reductant solution was added dropwise while stirring over a duration of 2 hours and heating gently, to no more than 60° C. The product of this reaction was in a solution/suspension form, which was used in two ways: (1) used directly to spray onto a surface of a Nafion sheet and (2) was added with a suspension of carbon black-supported Pt particles.

COMPARATIVE EXAMPLE 1

For comparison purpose, an electron-conducting (but not proton-conducting) polymer-transition metal complex sample was obtained from a non-sulfonated polyaniline (in its basic emeraldine form) via a similar procedure to ensure a comparable Pt content.

EXAMPLE 2

As in example 1, 5.73 g of sulfonated polyaniline were suspended in 100 ml of distilled water. Then, 80 ml of 1.15% aqueous $H_2IrCl_6$ were added slowly to the polyaniline suspension/solution for a period of 60 minutes while stirring constantly. The resulting sulfonated polyaniline-$IrCl_4$ complex was separated by centrifuging and decanting. The resulting solid was rinsed with distilled water until the rinse water had a pH value of 7.

The reductant solution of Example 1 was added to the sulfonated polyaniline-$IrCl_4$ complex for a period of 2 hours at a temperature of 60° C. The product of this reaction was rinsed with distilled water until the rinse water had a pH of 7, and then was dried at 110° C. for 24 hours.

EXAMPLE 3

As in example 1, 5.73 g of sulfonated polyaniline were suspended (and partially dissolved) in 100 ml of distilled water. Then, 100 ml of 3.15% aqueous $Ni(ClO_4)_2\cdot6H_2O$ were added slowly to the polyaniline suspension/solution for a period of 60 minutes while stirring constantly to produce sulfonated polyaniline-NiCl$_2$ complex. The reductant solution of Example 1 was added to the sulfonated polyaniline-NiCl$_2$ complex for a period of 2 hours at a temperature of 60° C. to produce the desired heterogeneous catalyst polymer containing Ni atoms covalently bonded thereto and presumably additional Ni nano particles physically dispersed in the polymer matrix. TEM studies indicate that a majority of the nano catalyst particles are smaller than 1.5 nm in size with a sizable number of them are approximately 0.5-0.6 nm.

EXAMPLE 4

As in example 1, 5.73 g of sulfonated polyaniline were suspended (and partially dissolved) in 100 ml of distilled water. Then, 100 ml of 3% aqueous Co(ClO$_4$)$_2$-6H$_2$O were added slowly to the polyaniline suspension/solution for a period of 60 minutes while stirring constantly to produce sulfonated polyaniline-CoCl$_n$ (n=2-4) complex. The reductant solution of Example 1 was added to the sulfonated polyaniline-CoCl$_n$ complex for a period of 2 hours at a temperature of 60° C. to produce the desired heterogeneous catalyst polymer containing Co atoms covalently bonded thereto and presumably additional Co nano particles physically dispersed in the polymer matrix. TEM studies indicate that a majority of the nano catalyst particles are smaller than 2 nm in size with a sizable number of them are approximately 0.6-0.8 nm.

EXAMPLE 5

A sulfonated pyrrole-based polymer (with X=NH and Y=SO$_3$—, m=1, and A=H in Formula 6) was synthesized by following a procedure adapted from Aldissi, et al., U.S. Pat. No. 4,880,508, Nov. 14, 1989. Approximately 5.78 g of the resulting sulfonated pyrrole-based polymer was dissolved in 100 ml of distilled water. Then, 105 ml of 0.98% aqueous H$_2$PtCl$_6$ were added to the polypyrrole suspension over the course of 60 minutes while stirring constantly. The resulting polypyrrole-PtCl$_4$ complex was separated by centrifuging and decanting. The resulting solid was rinsed with distilled water until the rinse water had a pH value of 7.

The reductant solution of Example 1 was added to the polypyrrole-PtCl$_4$ complex at a temperature of 60° C. for a period of 2 hours. The product of this reaction was rinsed with distilled water until the rinse water had a pH of 7, and then was dried at 110° C. for 24 hours. High-resolution TEM studies indicate that Pt atoms (most of them with a diameter smaller than 1 nm) are relatively uniformly dispersed in the matrix polymer.

COMPARATIVE EXAMPLE 5

For comparison purpose, an electron-conducting (but not proton-conducting) polymer-transition metal complex sample was obtained from a non-sulfonated polypyrrole via a similar procedure to ensure a comparable Pt content.

EXAMPLE 6

As in example 5, 4.92 g of sulfonated pyrrole-based polymer was dissolved in 100 ml of distilled water. Then, 100 ml of 3% aqueous Co(ClO$_4$)$_2$-6H$_2$O were added to the sulfonated pyrrole polymer solution for a duration of 60 minutes while stirring constantly. The resulting sulfonated polypyrrole-CoCl$_n$ complex was separated by centrifuging and decanting. The resulting solid was rinsed with distilled water until the rinse water had a pH of 7.

A reductant solution was prepared by dissolving 1.3 g NaBH$_4$ and 0.6 g NaOH in 100 ml of distilled water at room temperature and stirring for 30 minutes. This reductant solution was added to the sulfonated polypyrrole-CoCl$_n$ complex for a period of 2 hours at a temperature of 60° C. The product of this reaction was rinsed with distilled water until the rinse water had a pH value of 7, and then was dried at 110° C. for 24 hours.

EXAMPLE 7

Preparation of Poly (Alkyl Thiophene) as an Electron-Conducting Component of a Mixture Water-soluble conductive polymers having a thiophene ring (X=sulfur) and alkyl groups containing 4 carbon atoms (m=4) in Formula 6 were prepared, according to a method adapted from Aldissi, et al. (U.S. Pat. No. 4,880,508, Nov. 14, 1989). The surfactant molecules of these polymers were sulfonate groups with sodium. Conductivity of this polymer in a self-doped state were from about $10^{-3}$ to about $10^{-2}$ S/cm. When negative ions from a supporting electrolyte used during synthesis were allowed to remain in the polymer, conductivities up to about 50 S/cm were observed.

A doped poly (alkyl thiophene) (PAT) with Y=SO$_3$H and A=H in Formula 6 that exhibited an electron conductivity of 12.5 S/cm was dissolved in water. A sulfonated poly(ether ether ketone)-based material called poly (phthalazinon ether sulfone ketone) (PPESK) was purchased from Polymer New Material Co., Ltd., Dalian, China. With a degree of sulfonation of approximately 93%, this polymer was soluble in an aqueous hydrogen peroxide (H$_2$O$_2$) solution. A water solution of 3 wt. % poly (alkyl thiophene) and an aqueous H$_2$O$_2$ solution of 3 wt. % sulfonated PPESK was mixed at several PPESK-to-PAK ratios and stirred at 70° C. to obtain several polymer blend solution samples.

Samples of poly (alkyl thiophene)-PPESK mixtures in a thin film form were obtained by casting the aforementioned solutions onto a glass plate, allowing water to evaporate. The proton and electron conductivity values of the resulting solid samples were then measured at room temperature. The results indicate that good electron and proton conductivities can be obtained within the range of 30-75% PPESK. It may be noted that poly (alkyl thiophene) can go through the complexing and reduction procedures to obtain a heterogeneous catalyst polymer, which is soluble in water. In this case, PPESK can be used to improve the proton conductivity if deemed necessary.

EXAMPLE 8

Bi-Cyclic Conducting Polymer as a Second Electron- and Proton-Conducting Polymer The preparation of conductive polymers represented by Formula 5 having H for both R$_1$ and R$_2$, S for X, and H$^+$ for M was accomplished by following a procedure suggested by Saida, et al. (U.S. Pat. No. 5,648,453, Jul. 15, 1997). These polymers exhibit electronic conductivity in the range of $5\times10^{-2}$ S/cm to 1.4 S/cm and proton conductivity of $5\times10^{-4}$ S/cm $1.5\times10^{-2}$ S/cm.

Six polymer blends were prepared from such a bi-cyclic polymer (electron conductivity $\sigma_e$=1.1 S/cm and proton conductivity $\sigma_p$=3×10$^{-3}$ S/cm) and approximately 50% by wt. of the following proton-conductive polymers: poly (perfluoro sulfonic acid) (PPSA), sulfonated PEEK (S-PEEK), sulfonated polystyrene (S-PS), sulfonated PPESK, sulfonated polyimide (S-PI), and sulfonated polyaniline (S-PANi). The conductivities of the resulting polymer blends are $\sigma_e$=0.22 S/cm and $\sigma_p$=2×10$^{-2}$ S/cm for (bi-cyclic+PPSA), $\sigma_e$=0.2 S/cm and $\sigma_p$=7×10$^{-3}$ S/cm for (bi-cyclic+S-PEEK), $\sigma_e$=0.23 S/cm and $\sigma_p$=5.5×10$^{-3}$ S/cm for (bi-cyclic+S-PS), $\sigma_e$=0.19 S/cm and $\sigma_p$=6×10$^{-3}$ S/cm for (bi-cyclic+S-PPESK), $\sigma_e$=0.21 S/cm and $\sigma_p$=7.5×10$^{-3}$ S/cm for (bi-cyclic+S-PI), and $\sigma_e$=0.75 S/cm and $\sigma_p$=3×10$^{-3}$ S/cm for (bi-cyclic+S-PANi), These conductivity values are all within the acceptable ranges for these polymer blends to be a good matrix material for embedding the catalyst particles in a fuel cell electrode.

The above examples indicate how the solutions or suspensions of polymer-transition metal complexes were prepared for electrode fabrication. The viscosity of the resulting solutions and/or suspensions (or dispersions) was adjusted to vary between a tooth paste-like thick fluid and a highly dilute "ink," depending upon the relative amount of water or other liquid medium used. These solutions/suspensions can be applied to a primary surface of a carbon paper or that of a PEM layer (e.g. Nafion or sulfonated PEEK sheet) via spraying, printing (inkjet printing or screen printing), brushing, or any other coating means. In the present study, electrodes were fabricated on carbon paper sheets (for the anode) and Teflon-treated carbon paper sheets (for the cathode). The paste-like mixture was applied to the sheets by screen printing, and the sheets were dried at 120° C. for 5 hours. The ink-like mixture was sprayed onto the sheets. The transition metal content of the resulting impregnated carbon paper sheets was typically between approximately 0.15 to 0.35 mg/cm$^2$. Circular discs 2.5 cm in diameter (approximately 5 cm$^2$ in area) were cut from the impregnated carbon paper sheets. PEM films 3.5 cm in diameter, were cut from a Nafion-117 sheet to serve as a solid electrolyte layer in a fuel cell.

Figure 7:
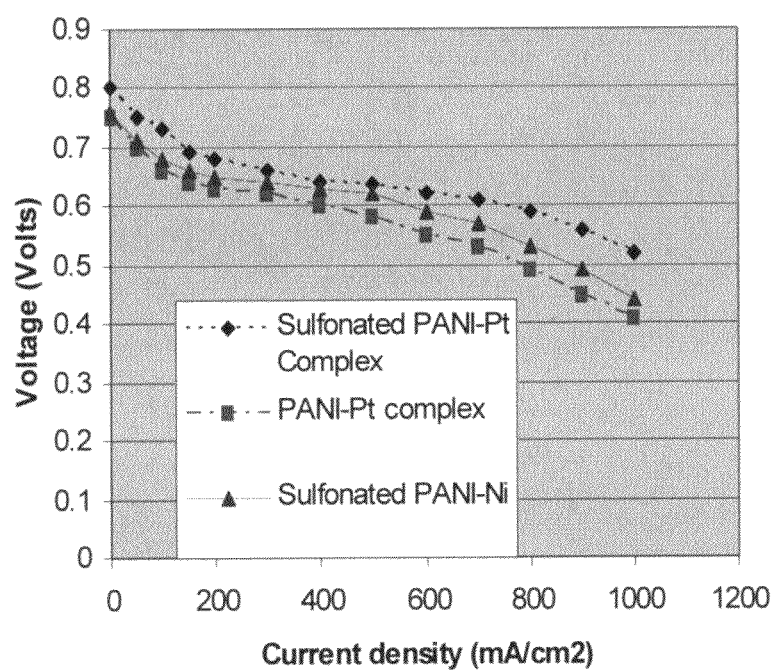
FIG. 7 The polarization curves of three fuel cells: the first containing a polymer-Pt complex derived from a sulfonated polyaniline, the second containing a polymer-Pt complex derived from a non-sulfonated polyaniline, and the third containing a polymer-Ni complex derived from a sulfonated polyaniline, all via complexing and reduction.

Membrane-electrode assemblies (MEAs) were fabricated as sandwich structures of PEMs between impregnated carbon sheets (with the electro-catalyst composition film sandwiched between a PEM surface and a GDL carbon paper), sintered in a heated press tool by hot pressing. The MEAs were tested in a standard hydrogen-oxygen single-cell fuel cell and, in some cases, a direct methanol fuel cell. The results are summarized as follows:

FIG. 7 shows the polarization curves of three single-cell fuel cells that contain sulfonated polyaniline-Pt complex (Example 1), baseline un-sulfonated polyaniline-Pt complex (Comparative Example 1), and sulfonated polyaniline-Ni complex (Example 3), respectively, as an electro-catalyst composition. These data demonstrate that the sulfonated polyaniline-Pt complex is a much more effective electro-catalyst compared to its un-sulfonated counterpart. They further demonstrate that ultra-small nano particles of nickel (average dimension smaller than 1 nm), when dispersed in and bonded to a sulfonated conducting polymer, provide an outstanding electro-catalytic effect in a hydrogen-oxygen PEM fuel cell. Nickel is much less expensive and more abundant than platinum.

Figure 8:
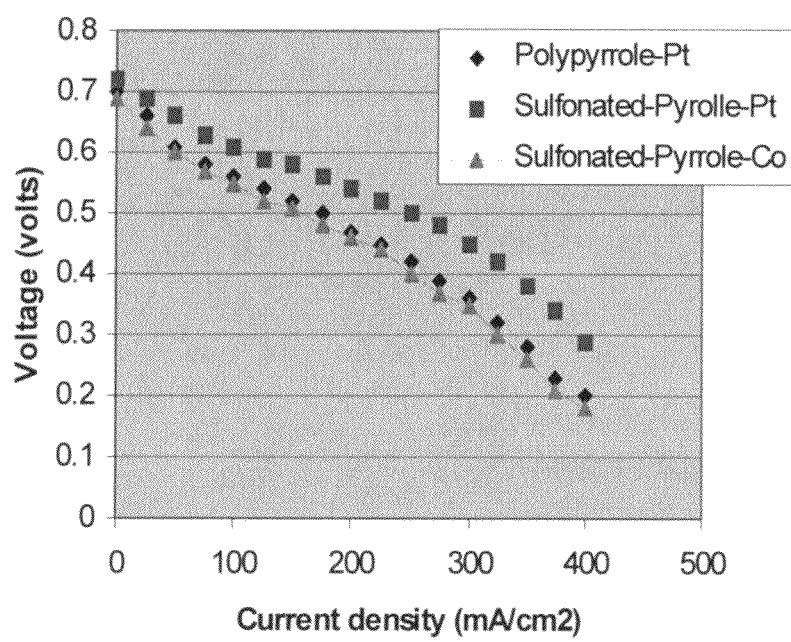
FIG. 8 The polarization curves of three fuel cells: the first containing a polymer-Pt complex derived from a sulfonated pyrrole-based polymer, the second containing a polymer-Pt complex derived from a non-sulfonated polypyrrole, and the third containing a polymer-Co complex derived from a sulfonated pyrrole-based polymer, all via complexing and reduction.

FIG. 8 shows the polarization curves of three single-cell direct methanol fuel cells that contain sulfonated pyrrole-based polymer-Pt complex (Example 5, average Pt particle size=2.5 nm), baseline un-sulfonated polypyrrole-Pt complex (Comparative Example 5, average Pt particle size=2.3 nm), and sulfonated pyrrole-based polymer-Co complex (Example 6, average Co particle size=1.2 nm in the sample), respectively, as an electro-catalyst composition. A 25% by weight methanol in water was used as the fuel in these cells. These data demonstrate that the sulfonated pyrrole-based polymer-Pt complex is a much more effective electro-catalyst compared to its un-sulfonated counterpart. They further demonstrate that ultra-small nano particles of cobalt (average dimension smaller than 1.2 nm), when dispersed in and bonded to a sulfonated conducting polymer, provide an electro-catalytic effect, which is comparable to that of non-sulfonated polypyrrole-Pt catalyst system, in a PEM-type fuel cell such as a DMFC. Cobalt is much less expensive and more abundant than platinum.

The fuel cell electro-catalyst compositions disclosed in this application have the following major advantages:

1. The catalytically active particles are relatively uniformly dispersed in a polymer that forms a three-dimensional electrode structure with a higher catalytic activity per unit volume, hence per unit weight, than an electrode having catalyst particles distributed two-dimensionally along a surface only. In addition, the further reduced catalyst particle sizes (e.g., smaller than 2 nm, preferably smaller than 1 nm) and, hence, increased surface-to-volume ratios, result in a much higher catalyst effectiveness.

2. This increased specific catalytic activity allows the use of a smaller amount of costly catalytic materials such as platinum in the electrode.

3. The catalytically active particles are embedded in an electron- and proton-conducting polymer, which helps to establish two networks of charge-conducting paths, one for conducting electrons between the catalyst particle surfaces and a gas diffusion layer and the other for conducting protons between the catalyst particle surfaces and a proton-conducting solid electrolyte layer. These networks lead to a much reduced Ohmic loss and higher power output.

4. The ability to disperse ultra-small catalyst nano particles (smaller than 2 nm on average with many particles smaller than 1 nm) surprisingly enables much less expensive metals such as Fe, Co, Ni, and Mn to become highly effective electro-catalysts for fuel cell applications. It is now possible for the fuel industry to avoid using expensive catalysts such as Pt.

5. The embedding of the catalytically active particles in a polymer matrix to form a composite structure also provides the electrode with better mechanical integrity (e.g., stability in terms of resistance to disruption by impact, vibration, and thermal cycling fatigue) as compared with an electrode based on aggregates of conducting particles (e.g., carbon black or conducting polymer particles) bearing catalyst particles on their surfaces.

6. The electron- and proton-conducting polymer matrix appears to provide resistance to carbon monoxide poisoning of colloidal platinum particles. This is presumably due to the size of CO that slows down the diffusion of CO through the polymer at the anode.

What is claimed:

1. A fuel cell electro-catalyst composition comprising a proton- and electron-conducting polymer having at least one heteroatom per backbone monomer unit thereof and a plurality of neutral transition metal atoms covalently bonded to at least a portion of said heteroatoms;
   wherein said proton- and electron-conducting polymer is selected from the group consisting of sulfonated bi-cyclic polymers, derivatives thereof, and combinations thereof, wherein said proton- and electron-conducting polymer has an electronic conductivity no less than 10$^{-4}$ S/cm and a proton conductivity no less than 10$^{-5}$ S/cm.

2. The electro-catalyst composition as defined in claim 1, further comprising a plurality of catalytically active particles of a transition metal, nucleated around said covalently bonded transition metal atoms.

3. The electro-catalyst composition as defined in claim 1, further comprising a plurality of catalytically active particles of a transition metal physically dispersed in said proton- and electron-conducting polymer.

4. The electro-catalyst composition as defined in claim 2, wherein said catalytically active particles of a transition metal have an average dimension smaller than 2 nanometers.

5. The electro-catalyst composition as defined in claim 3, wherein said catalytically active particles of a transition metal physically dispersed in the proton- and electron-conducting polymer have an average dimension smaller than 2 nanometers.

6. The electro-catalyst composition as defined in claim 1, wherein said composition forms a thin-film electrode comprising pores that are interconnected.

7. The electro-catalyst composition as defined in claim 1, wherein said transition metal atoms include atoms selected from the group consisting of platinum, iridium, osmium, rhenium, ruthenium, rhodium, palladium, iron, cobalt, nickel, chromium, manganese, copper, vanadium, and combinations thereof.

8. The electro-catalyst composition as defined in claim 7, wherein said transition metal atoms include non-platinum atoms selected from the group consisting of iron, cobalt, nickel, chromium, manganese, copper, and vanadium and the composition additionally includes a plurality of catalytically active particles of a transition metal, nucleated around said covalently bonded transition metal atoms and said catalytically active particles of a transition metal have an average dimension smaller than 1.5 nm.

9. The electro-catalyst composition as defined in claim 8, wherein said catalytically active particles of a transition metal have an average dimension smaller than 1 nm.

10. The electro-catalyst composition as defined in claim 1, further comprising nano catalyst particle-bearing conductive particles dispersed in said proton- and electron-conducting polymer, wherein said conductive particles are selected from carbon black, nanometer-thickness graphite platelets, carbon nano-fibers, graphitic nano-fibers, carbon nanotubes, carbon nano-scrolls, or a combination thereof.

11. A fuel cell electrode comprising a gas diffusion layer as a catalyst-supporting layer, wherein said gas diffusion layer is coated with or impregnated by an electro-catalyst composition as defined in claim 1.

12. A fuel cell membrane-electrode assembly comprising a proton-conducting electrolyte layer, a thin layer of an electro-catalyst composition as defined in claim 1 attached to one or both opposing surfaces of said electrolyte layer, a first gas diffusion layer attached to or bonded with said thin layer of electro-catalyst composition, and a second gas diffusion layer attached to or bonded with a second thin layer of electro-catalyst composition.

13. A fuel cell comprising therein a membrane electrode assembly as defined in claim 12, a first separator or bipolar plate connected to said first gas diffusion layer, and a second separator or bipolar plate connected to said second gas diffusion layer.

14. An electro-catalyst-coated proton exchange membrane comprising an electro-catalyst composition as defined in claim 1 wherein said composition is coated on a surface or two opposing surfaces of said membrane.

15. A fuel cell comprising therein an electro-catalyst composition as defined in claim 1, wherein said electro-catalyst composition is bonded between a gas diffusion layer and a proton exchange membrane.

16. A fuel cell comprising therein a proton-conducting electrolyte layer sandwiched between an anode and a cathode, wherein said anode and/or cathode comprises an electro-catalyst composition as defined in claim 1.

* * * * *